US012666273B2

(12) United States Patent
Liu

(10) Patent No.: US 12,666,273 B2
(45) Date of Patent: Jun. 23, 2026

(54) UPLINK CHANNEL TRANSMISSION USING TRANSMIT BEAM DIVERSITY TO MULTI-TRANSMIT-RECEIVE POINTS(TRPS)

(71) Applicant: Beijing Xiaomi Mobile Software Co., Ltd., Beijing (CN)

(72) Inventor: Yang Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 251 days.

(21) Appl. No.: 18/559,141

(22) PCT Filed: May 7, 2021

(86) PCT No.: PCT/CN2021/092186
§ 371 (c)(1),
(2) Date: Nov. 6, 2023

(87) PCT Pub. No.: WO2022/233041
PCT Pub. Date: Nov. 10, 2022

(65) Prior Publication Data
US 2024/0236708 A1      Jul. 11, 2024

(51) Int. Cl.
*H04W 16/28*          (2009.01)
*H04W 72/0446*          (2023.01)
(Continued)

(52) U.S. Cl.
CPC ....... *H04W 16/28* (2013.01); *H04W 72/0446* (2013.01); *H04W 72/1268* (2013.01); *H04W 72/21* (2023.01)

(58) Field of Classification Search
CPC ............. H04W 16/28; H04W 72/0446; H04W 72/1268; H04W 72/046; H04W 72/21;
(Continued)

(56) References Cited

U.S. PATENT DOCUMENTS

2020/0136786 A1*    4/2020  Wu ...................... H04L 1/1812
2023/0361946 A1*   11/2023  Li ...................... H04W 52/367
(Continued)

FOREIGN PATENT DOCUMENTS

CN        110611958  A      12/2019
CN        111107555  A       5/2020
(Continued)

OTHER PUBLICATIONS

U.S. Appl. No. 63/104,152, filed Oct. 22, 2020 (Year: 2020).*
(Continued)

*Primary Examiner* — Sun Jong Kim
(74) *Attorney, Agent, or Firm* — Volpe Koenig

(57)          ABSTRACT

An uplink channel transmission method, performed by a terminal device, including: performing two adjacent repetitive transmissions of same data in an uplink channel on a first transmission resource and a second transmission resource respectively; where the two adjacent repetitive transmissions use different transmitting beams to transmit to different Transmit-Receive Points (TRP) of a same base station, a beam switching time for switching a beam direction is presented between time-domain resources of the first transmission resource and the second transmission resource; the first transmission resource corresponds to a former transmission occasion in two adjacent transmission occasions for uplink channel transmitting; the second transmission resource corresponds to a latter transmission occasion in the two adjacent transmission occasions for uplink channel transmitting.

10 Claims, 17 Drawing Sheets

(51) Int. Cl.
H04W 72/1268 (2023.01)
H04W 72/21 (2023.01)

(58) Field of Classification Search
CPC . H04L 2001/0093; H04L 1/08; H04B 7/0404;
H04B 7/0408; H04B 7/088; H04B 7/0695
See application file for complete search history.

(56) References Cited

U.S. PATENT DOCUMENTS

| | | | | |
|---|---|---|---|---|
| 2023/0389007 | A1* | 11/2023 | Deghel | H04W 56/001 |
| 2025/0310899 | A1* | 10/2025 | Khoshnevisan | H04W 52/242 |

FOREIGN PATENT DOCUMENTS

| | | | | |
|---|---|---|---|---|
| CN | 111448840 A | 7/2020 | | |
| CN | 111867094 A | 10/2020 | | |
| CN | 112511281 A | 3/2021 | | |
| WO | 2021012163 A1 | 1/2021 | | |
| WO | 2021050060 A1 | 3/2021 | | |
| WO | WO-2022151302 A1 * | 7/2022 | | H04B 7/06952 |

OTHER PUBLICATIONS

State Intellectual Property Office of the People's Republic of China, Office Action and Search Report Issued in Application No. 202180001477X, Apr. 28, 2025, 12 pages.
ISA State Intellectual Property Office of the People's Republic of China, Written Opinion of the International Searching Authority Issued in Application No. PCT/CN2021/092186, Feb. 9, 2022, WIPO, 6 pages.
Lenovo, Motorola Mobility, "Enhancements on Multi-TRP for PDCCH, PUCCH and PUSCH", R1-2008911, 3GPP TSG RAN WG1 #103-e, e-Meeting, Oct. 26-Nov. 13, 2020, 15 pages.
ISA State Intellectual Property Office of the People's Republic of China, International Search Report Issued in Application No. PCT/CN2021/092186, Feb. 9, 2022, WIPO, 2 pages.
Lenovo et al.,"Discussion of multi-TRP/panel transmission",3GPP TSG RAN WG1 Meeting #98bis R1-1910142, Oct. 5, 2019,14 pages.
Vivo.,"Discussion on the enhancements to configured grants",3GPP TSG RAN WG1 Meeting #98bis R1-1910207, Oct. 3, 2019,9 pages.

* cited by examiner

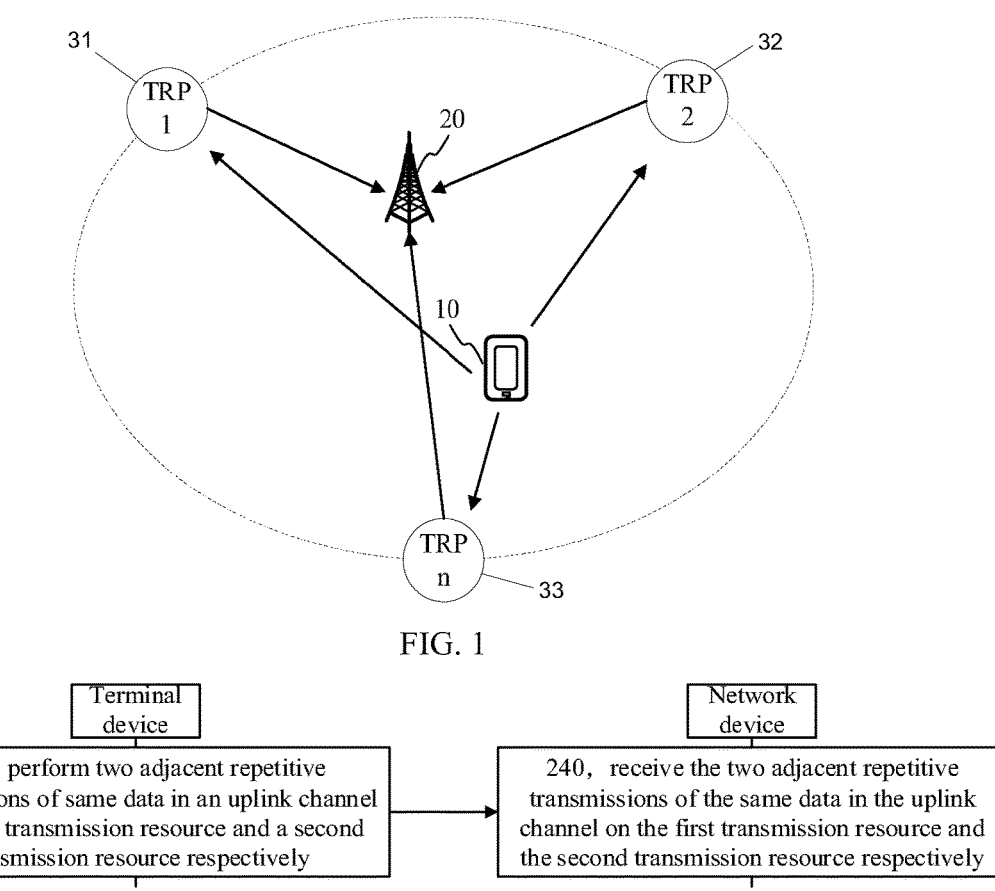
FIG. 1
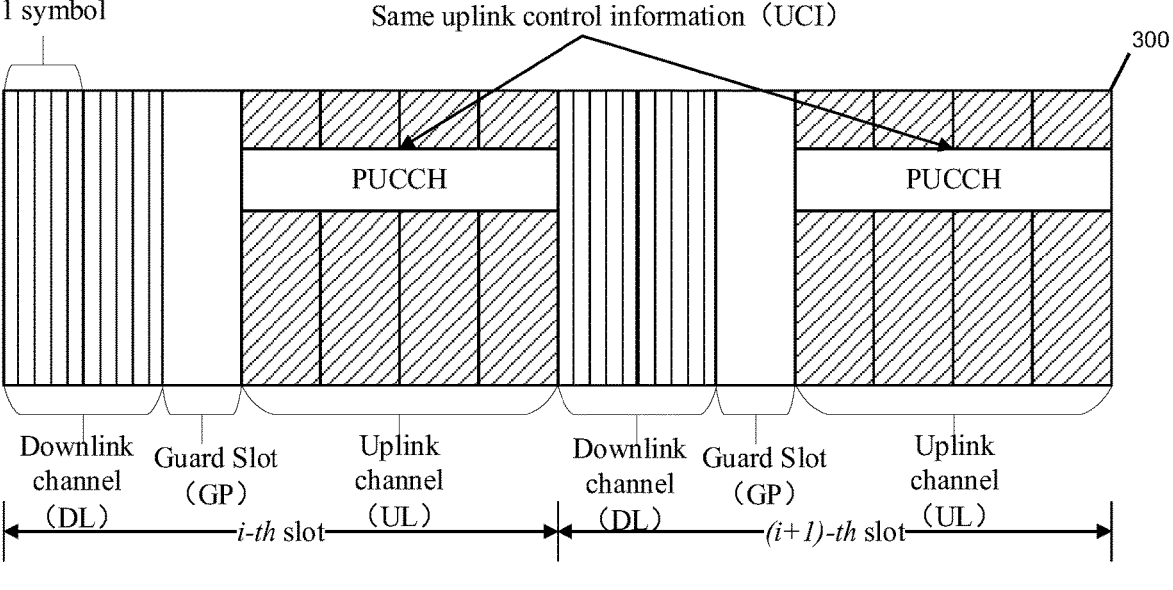
FIG. 2
FIG. 3

Slot boundary

Slot boundary

Slot boundary

Slot boundary

Interval=1 symbol
1 sub-slot=7 symbols

Interval (1 symbol)

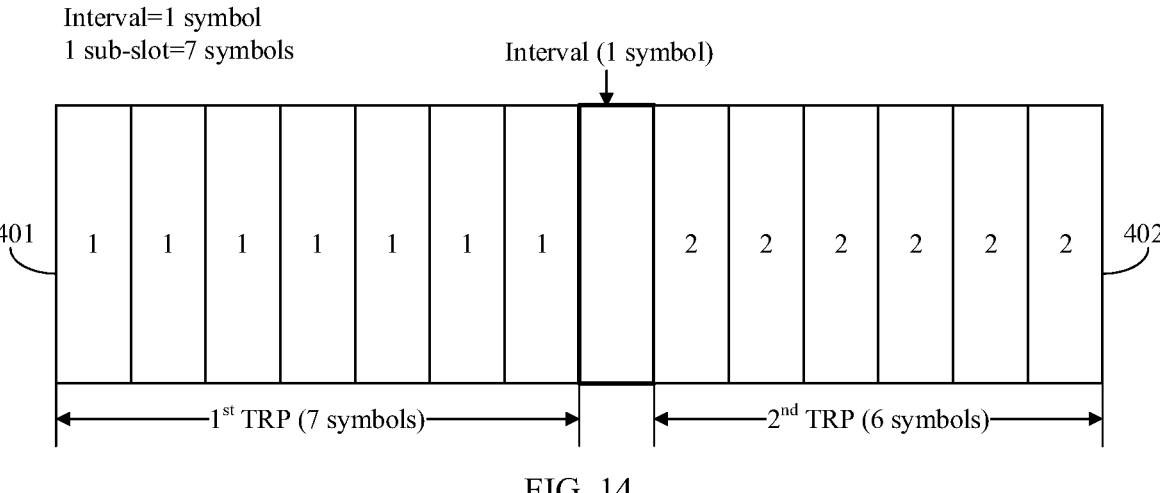

401

| 1 | 1 | 1 | 1 | 1 | 1 | 1 | | 2 | 2 | 2 | 2 | 2 | 2 |

402

←————1$^{st}$ TRP (7 symbols)————→ ←————2$^{nd}$ TRP (6 symbols)————→

FIG. 14

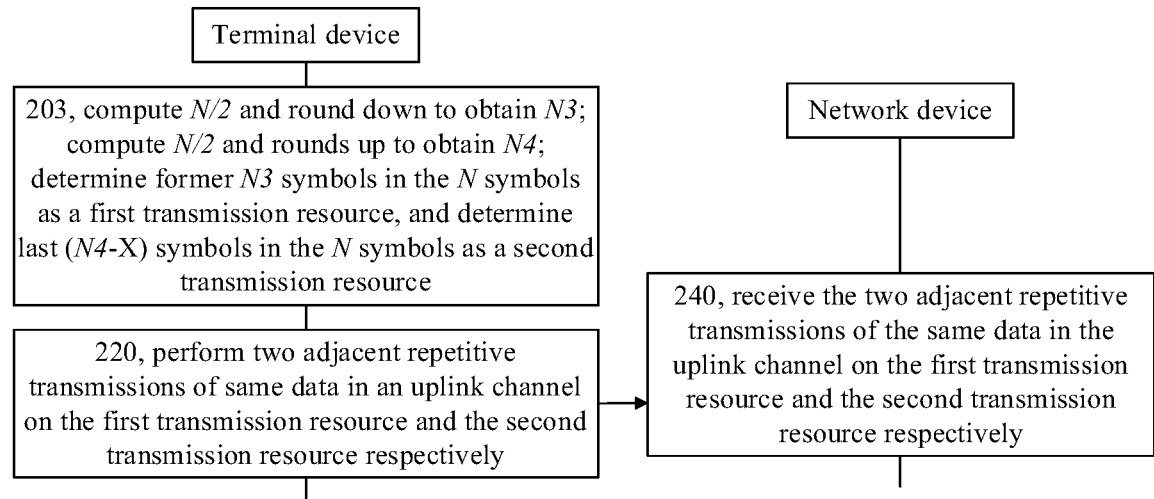

Terminal device 203, compute $N/2$ and round down to obtain $N3$;
compute $N/2$ and rounds up to obtain $N4$;
determine former $N3$ symbols in the $N$ symbols
as a first transmission resource, and determine
last ($N4$-X) symbols in the $N$ symbols as a second
transmission resource 220, perform two adjacent repetitive
transmissions of same data in an uplink channel
on the first transmission resource and the second
transmission resource respectively Network device 240, receive the two adjacent repetitive
transmissions of the same data in the
uplink channel on the first transmission
resource and the second transmission
resource respectively

FIG. 15

Interval=1 symbol
1 sub-slot=7 symbols

Interval (1 symbol)

Delete 1$^{st}$ symbol of 2$^{nd}$ TRP

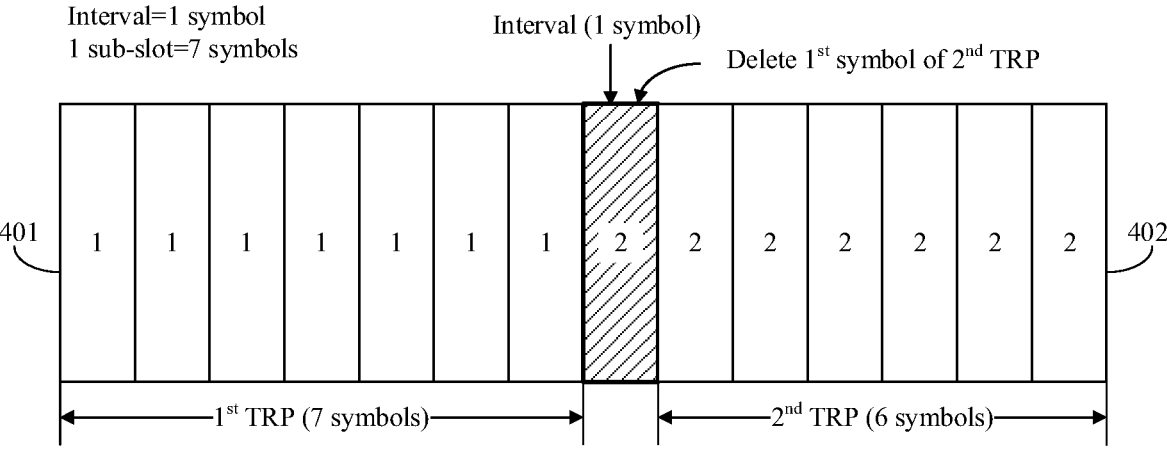

401

| 1 | 1 | 1 | 1 | 1 | 1 | 1 | 2 | 2 | 2 | 2 | 2 | 2 | 2 |

402

←————1$^{st}$ TRP (7 symbols)————→ ←————2$^{nd}$ TRP (6 symbols)————→

FIG. 16

Terminal device 204, compute *(Y+N-X)/2* and round down to obtain *N5*; compute *(Y+N-X)/2* and round up to obtain *N6*; determine former *N5* symbols in the *(N+Y)* symbols as the first transmission resource, and determine last *N6* symbols in the *(N+Y)* symbols as the second transmission resource 220, perform two adjacent repetitive transmissions of same data in an uplink channel on the first transmission resource and the second transmission resource respectively Network device 240, receive the two adjacent repetitive transmissions of the same data in the uplink channel on the first transmission resource and the second transmission resource respectively

FIG. 17

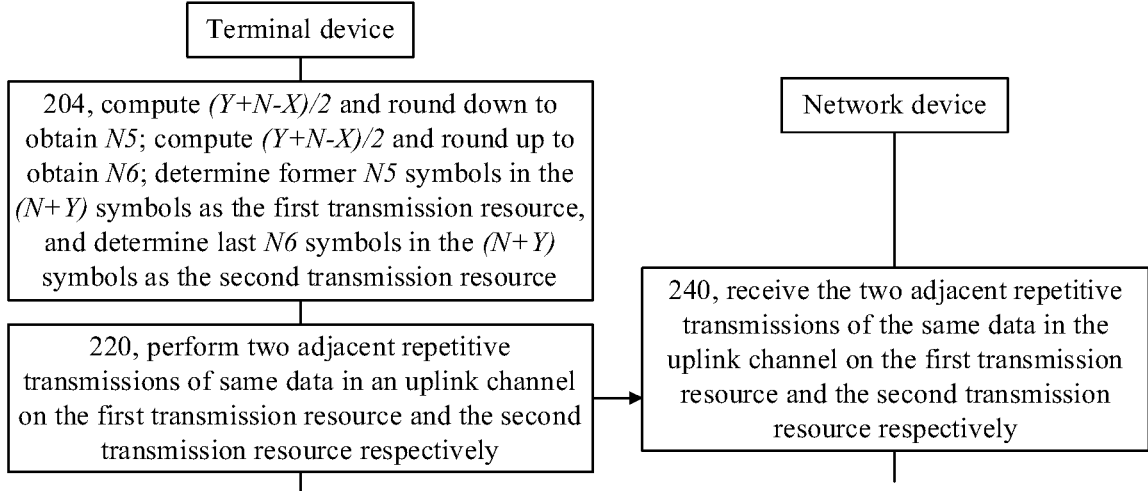

Interval=1 symbol
Remaining available symbol Y=1

Interval (1 symbol)

PUCCH (N=9)

401   1   1   1   1       2   2   2   2   2   402

←1$^{st}$ TRP (4 symbols)→   ←2$^{nd}$ TRP (5 symbols)→

FIG. 18

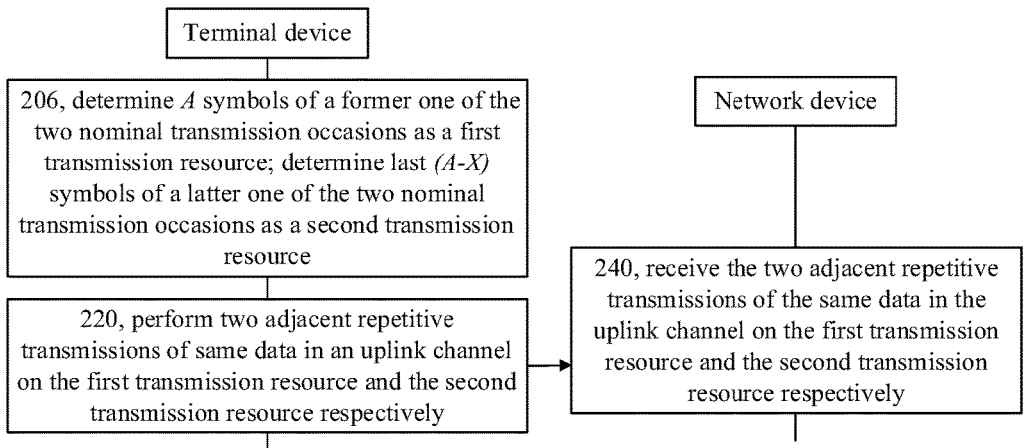
FIG. 21
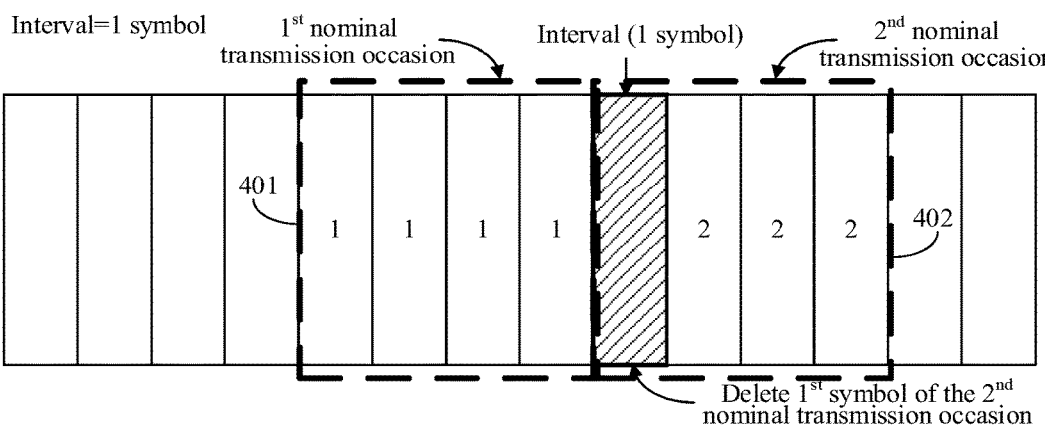
FIG. 22
FIG. 23

Interval=1 symbol Interval (1 symbol)
1 sub-slot=2 symbols 402

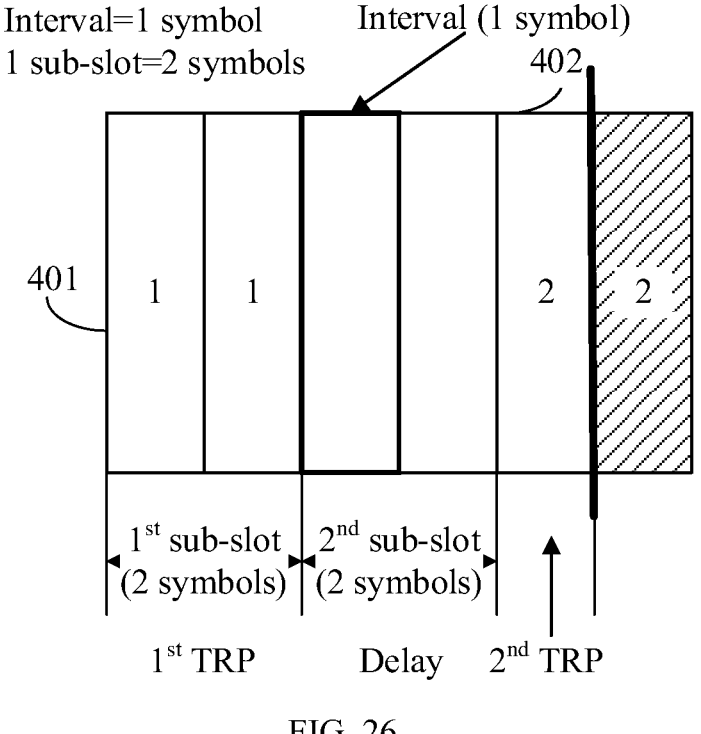

401

| 1 | 1 | | | 2 | 2 |

1st sub-slot 2nd sub-slot
(2 symbols) (2 symbols)

1st TRP Delay 2nd TRP

FIG. 26

Terminal device 208, determine a first sub-slot starting from an S-th symbol as a first transmission resource; and determine a second sub-slot starting from a (S+M+X)-th symbol as the second transmission resource, where the (S+M+X)-th symbol is obtained by delaying X symbols for the first transmission resource.

Network device 220, perform two adjacent repetitive transmissions of same data in an uplink channel on the first transmission resource and the second transmission resource respectively 240, receive the two adjacent repetitive transmissions of the same data in the uplink channel on the first transmission resource and the second transmission resource respectively

FIG. 27

Terminal device 209, compute *N/2* and rounds down to obtain *N3*; compute *N/2* and rounds up to obtain *N4*; determine *N3* symbols starting from the *S-th* symbol as a first transmission resource; determine *N4* symbols starting from a *(S+N3+X)-th* symbol as a second transmission resource, where the *(S+N3+X)-th* symbol is obtained by delaying *X* symbols for the first transmission resource Network device 220, perform two adjacent repetitive transmissions of same data in an uplink channel on the first transmission resource and the second transmission resource respectively 240, receive the two adjacent repetitive transmissions of the same data in the uplink channel on the first transmission resource and the second transmission resource respectively

FIG. 30

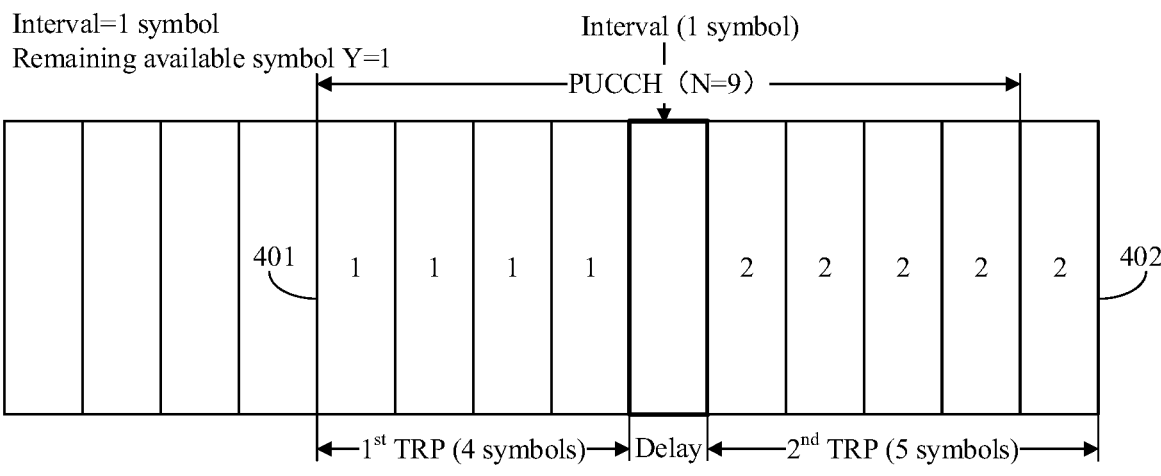

Interval=1 symbol
Remaining available symbol Y=1

Interval (1 symbol)

PUCCH (N=9)

401   1   1   1   1       2   2   2   2   2   402

←—1ˢᵗ TRP (4 symbols)—→ Delay ←———2ⁿᵈ TRP (5 symbols)———→

FIG. 31

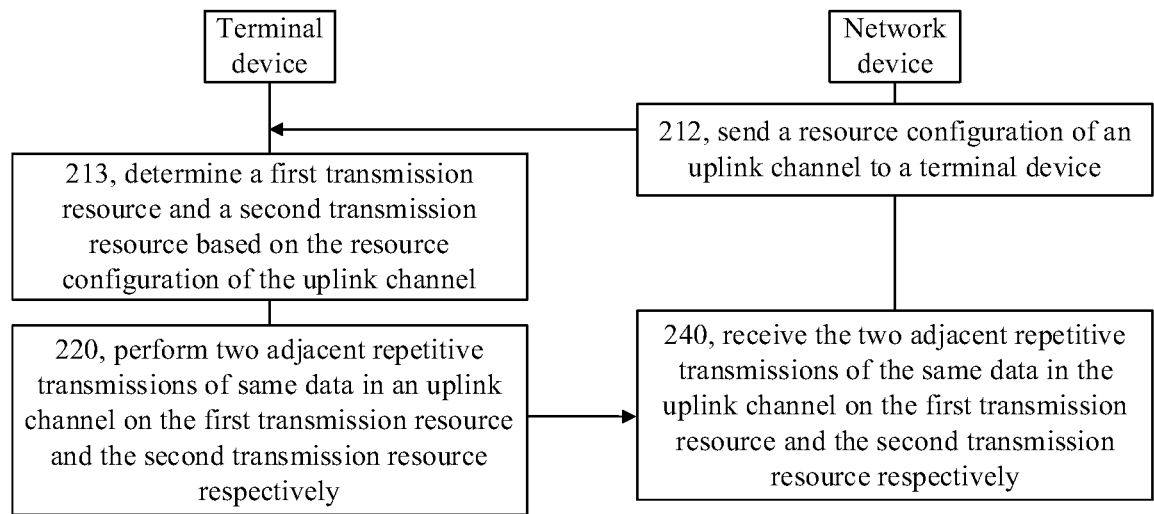
FIG. 39
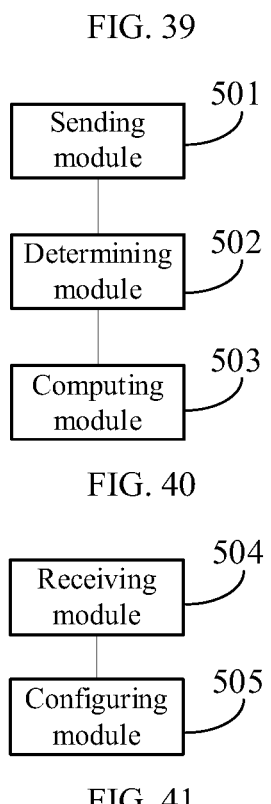
FIG. 40
FIG. 41

UPLINK CHANNEL TRANSMISSION USING TRANSMIT BEAM DIVERSITY TO MULTI-TRANSMIT-RECEIVE POINTS(TRPS)

REFERENCE TO RELATED APPLICATION

This application is a National Stage of International Application No. PCT/CN2021/092186, filed on May 7, 2021, the contents of all of which are incorporated herein by reference in their entirety.

TECHNICAL FIELD

The present application relates to the field of wireless communication, and in particular, to an uplink channel transmission method and apparatus, a device, and a storage medium.

BACKGROUND

3GPP (3rd Generation Partnership Project) introduced a repetitive transmission technology based on multi-TRP (Transmit-Receive Point) in a 5G NR (New Radio) system.

Based on the multi-TRP, a terminal device can repeatedly transmit an uplink channel for multiple TRPs of a base station. When repeatedly transmitting for TRPs in different directions, the terminal device needs to switch a beam direction.

SUMMARY

Embodiments of the present application provides an uplink channel transmission method and apparatus, a device, and a storage medium, which can introduce a beam switching time for uplink channel transmissions. The technical solution is as follows.

According to an aspect of the present application, an uplink channel transmission method is provided, where the method is performed by a terminal device, and the method includes: performing two adjacent repetitive transmissions of the same data in an uplink channel on a first transmission resource and a second transmission resource, respectively; where the two adjacent repetitive transmissions use different transmitting beams to transmit to different Transmit-Receive Points (TRP) of a same base station, a beam switching time for switching a beam direction is presented between time-domain resources of the first transmission resource and the second transmission resource; the first transmission resource corresponds to a former transmission occasion in two adjacent transmission occasions for uplink channel transmitting; the second transmission resource corresponds to a latter transmission occasion in the two adjacent transmission occasions for uplink channel transmitting.

According to an aspect of the present application, an uplink channel transmission method is provided, where the method is performed by a network device, and the method includes: receiving two adjacent repetitive transmissions of the same data in an uplink channel on a first transmission resource and a second transmission resource, respectively; where the two adjacent repetitive transmissions use different transmitting beams to transmit to different Transmit-Receive Points (TRP) of a same base station, a beam switching time for switching a beam direction is presented between time-domain resources of the first transmission resource and the second transmission resource; the first transmission resource corresponds to a former transmission occasion in two adjacent transmission occasions for uplink channel transmitting;

the second transmission resource corresponds to a latter transmission occasion in the two adjacent transmission occasions for uplink channel transmitting.

According to an aspect of the present application, a terminal device is provided, where the terminal device includes: a processor and a transceiver connected with the processor; where the transceiver is configured to perform two adjacent repetitive transmissions of same data in an uplink channel on a first transmission resource and a second transmission resource respectively; where the two adjacent repetitive transmissions use different transmitting beams to transmit to different Transmit-Receive Points (TRP) of a same base station, a beam switching time for switching a beam direction is presented between time-domain resources of the first transmission resource and the second transmission resource; the first transmission resource corresponds to a former transmission occasion in two adjacent transmission occasions for uplink channel transmitting; the second transmission resource corresponds to a latter transmission occasion in the two adjacent transmission occasions for uplink channel transmitting.

According to an aspect of the present application, a network device is provided, where the network device includes: a processor and a transceiver connected with the processor; where the transceiver is configured to receive two adjacent repetitive transmissions of the same data in an uplink channel on a first transmission resource and a second transmission resource respectively; where the two adjacent repetitive transmissions use different transmitting beams to transmit to different Transmit-Receive Points (TRP) of the network device, a beam switching time for switching a beam direction is presented between time-domain resources of the first transmission resource and the second transmission resource; the first transmission resource corresponds to a former transmission occasion in two adjacent transmission occasions for uplink channel transmitting; the second transmission resource corresponds to a latter transmission occasion in the two adjacent transmission occasions for uplink channel transmitting.

According to an aspect of the present application, a computer-readable storage medium is provided, where the computer-readable storage medium stores an executable instruction, and the executable instruction is loaded and executed by a processor to perform the uplink channel transmission method according to above aspects.

According to an aspect of the present application, a chip is provided, where the chip includes a programmable logic circuit and/or a program instruction, and when running on a computer device, the chip is configured to perform the uplink channel transmission method according to the above aspects.

According to an aspect of the present application, a computer program product is provided, where, when running on a processor of a computer device, the computer program product causes the computer device to perform the uplink channel transmission method according to the above aspects.

BRIEF DESCRIPTION OF DRAWINGS

In order to illustrate the technical solution in the embodiments of the present application more clearly, drawings needed in the description of the embodiments will be briefly introduced below. Obviously, the drawings in the following description are only some embodiments of the present application. For those of ordinary skills in the art, other drawings can be obtained according to these drawings without making creative efforts.

FIG. 1 is a schematic diagram of a system architecture provided by an exemplary embodiment of the present application.

FIG. 2 is a flowchart of an uplink channel transmission method provided by an exemplary embodiment of the present application.

FIG. 3 is a schematic diagram showing repetitive transmissions of a PUCCH between slots according to an uplink channel transmission method provided by an exemplary embodiment of the present application.

FIG. 14 is a schematic diagram of an uplink channel transmission method provided by an exemplary embodiment of the present application.

FIG. 15 is a flowchart of an uplink channel transmission method provided by an exemplary embodiment of the present application.

FIG. 16 is a schematic diagram of an uplink channel transmission method provided by an exemplary embodiment of the present application.

FIG. 17 is a flowchart of an uplink channel transmission method provided by an exemplary embodiment of the present application.

FIG. 18 is a schematic diagram of an uplink channel transmission method provided by an exemplary embodiment of the present application.

FIG. 21 is a flowchart of an uplink channel transmission method provided by an exemplary embodiment of the present application.

FIG. 22 is a schematic diagram of an uplink channel transmission method provided by an exemplary embodiment of the present application.

FIG. 23 is a schematic diagram of an uplink channel transmission method provided by an exemplary embodiment of the present application.

FIG. 26 is a schematic diagram of an uplink channel transmission method provided by an exemplary embodiment of the present application.

FIG. 27 is a flowchart of an uplink channel transmission method provided by an exemplary embodiment of the present application.

FIG. 30 is a flowchart of an uplink channel transmission method provided by an exemplary embodiment of the present application.

FIG. 31 is a schematic diagram of an uplink channel transmission method provided by an exemplary embodiment of the present application.

FIG. 39 is a flowchart of an uplink channel transmission method provided by an exemplary embodiment of the present application.

FIG. 40 is a structural block diagram of an uplink channel transmission apparatus provided by an exemplary embodiment of the present application.

FIG. 41 is a structural block diagram of an uplink channel transmission apparatus provided by an exemplary embodiment of the present application.

DETAILED DESCRIPTION

Figures 4, 5, 6, 7:
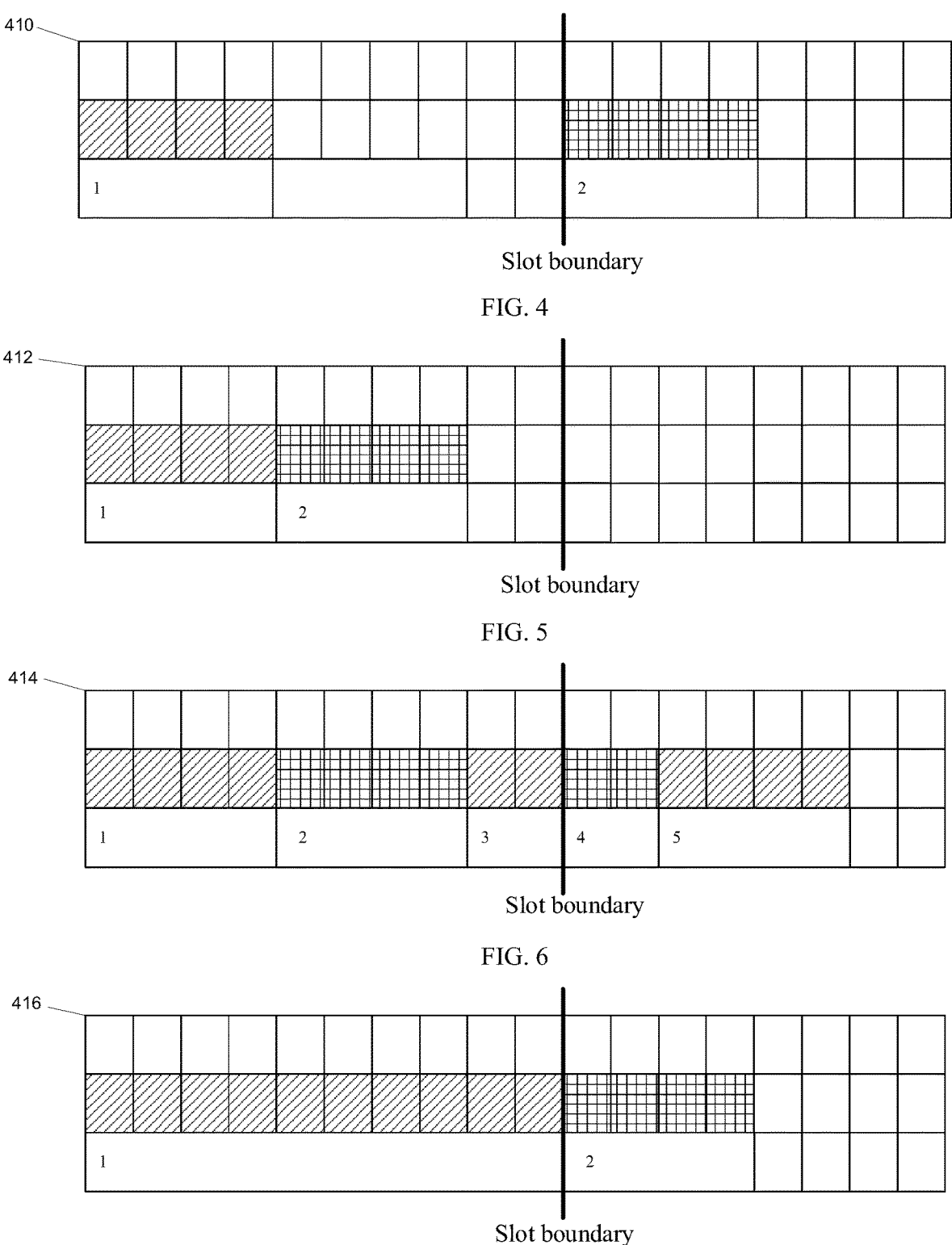
FIG. 4 is a schematic diagram showing repetitive transmissions of a PUSCH between slots according to an uplink channel transmission method provided by an exemplary embodiment of the present application.
FIG. 5 is a schematic diagram showing repetitive transmissions of a PUSCH between slots according to an uplink channel transmission method provided by an exemplary embodiment of the present application.
FIG. 6 is a schematic diagram showing repetitive transmissions of a PUSCH between slots according to an uplink channel transmission method provided by an exemplary embodiment of the present application.
FIG. 7 is a schematic diagram showing repetitive transmissions of a PUSCH between slots according to an uplink channel transmission method provided by an exemplary embodiment of the present application.

In order to make the purpose, technical solution and advantages of the present application clearer, embodiments of the present application will be further described in detail with the accompanying drawings.

Description will now be made in detail to illustrative embodiments, examples of which are shown in the accompanying drawings. When the following description refers to the drawings, unless otherwise indicated, the same reference numerals in different drawings indicate the same or similar elements. Implementations described in the following exemplary embodiments do not represent all implementations consistent with the present application. In contrary, they are merely examples of apparatuses and methods consistent with some aspects of the present application as described in detail in the appended claims.

The terminologies used in the present application are for the purpose of describing specific embodiments only and are not intended to limit the present application. Singular forms "a", "the" and "said" used in the specification of the present application and the appended claims are also intended to include plural forms, unless the context clearly indicates other meaning. It should also be understood that the term "and/or" as used herein refers to and includes any or all possible combinations of one or more associated listed items.

It should be understood that although the terms "first", "second", "third", etc., may be used to describe various information in the present application, such information should not be limited to these terms. These terms are only used to distinguish a same type of information from each other. For example, without departing from the scope of the present application, first information may also be referred to as second information, and similarly, second information may also be referred to as first information. Depending on context, word "if" as used herein can be interpreted as "when" or "upon" or "in response to determining".

Referring to FIG. 1, it shows a schematic diagram of a system architecture provided by an embodiment of the present application. The system architecture may include: a terminal device 10 and a network device 20.

There are usually a plurality of terminal devices 10, and one or more terminal devices 10 may be distributed in a cell managed by each network device 20. The terminal device 10 may include various hand-held devices, vehicle-mounted devices, wearable devices, computing devices, or other processing devices connected to a wireless modem, as well as various forms of user equipment (UE), mobile stations (MS), and the like. For convenience of description, in embodiments of the present application, the above-mentioned devices are collectively referred to as terminal devices.

The network device 20 is a device deployed in an access network to provide a wireless communication function for the terminal device 10. The network device 20 may include various forms of macro base stations, micro base stations, relay stations, access points, and the like. In systems with different wireless access technologies, the names of devices with network device functions may be different, for example, in 5G NR systems, the devices are referred to as gNodeB or gNB. With the evolution of communication technology, the name "network device" may change. For convenience of description, in embodiments of the present application, the above-mentioned devices providing wireless communication function for the terminal device 10 are collectively referred to as network devices.

For example, a network device 20 is deployed with multiple TRPs, for example, the network device 20 corresponds to TRP1 31, TRP2 32, . . . . TRPn 33. The terminal device uses different transmission beams to perform repetitive transmissions of an uplink channel for different TRPs, and the network device 20 receives the repetitive transmissions of the uplink channel sent by the terminal device through the multiple TRPs. For example, since relative orientations between different TRPs and the terminal device are different, the terminal device needs to use transmission beams in different beam directions to transmit beams to the TRPs in the corresponding directions for repetitive transmissions of the uplink channel.

The "5G NR system" in the embodiments of the present application can also be referred to as a 5G system or an NR system, but those skilled in the art can understand its meaning. The technical solution described in the embodiments of the present application can be applied to a 5G NR system, and can also be applied to a subsequent evolution system of the 5G NR system.

Referring to FIG. 2, FIG. 2 shows a flowchart of an uplink channel transmission method provided by an embodiment of the present application, where the method can be applied to the system architecture shown in FIG. 1. The method includes followings steps.

Step 220, a terminal device performs two adjacent repetitive transmissions of the same data in an uplink channel on a first transmission resource and a second transmission resource, respectively.

For the two adjacent repetitive transmissions, different transmitting beams to different TRPs of a same base station (the network device) are used to perform transmission, a beam switching time for switching a beam direction is presented between time-domain resources of the first transmission resource and the second transmission resource; the first transmission resource corresponds to a former transmission occasion in two adjacent transmission occasions for uplink channel transmitting; the second transmission resource corresponds to a latter transmission occasion in the two adjacent transmission occasions for uplink channel transmitting.

The first transmission resource corresponds to a former transmission occasion in two adjacent transmission occasions, and a beam facing a direction of a collaborated TRP is used for uplink channel transmission. The second transmission resource corresponds to a latter transmission occasion in the two adjacent transmission occasions.

Illustratively, the first transmission resource corresponds to an i-th transmission occasion, and the second transmission resource corresponds to a (i+1)-th transmission occasion, where i is a positive integer, and the i-th and (i+1)-th transmission occasions represent two transmission occasions in sequence.

A transmission occasion includes a transmission resource in the time domain. A transmission occasion includes at least one symbol in the time domain. Illustratively, the transmission occasion in step 220 represents an actual transmission occasion. The actual transmission occasion is an actual transmission occasion finally used by the terminal device for the uplink channel transmission. Illustratively, compared to the actual transmission occasion, there is also a nominal transmission occasion. The nominal transmission occasion is a transmission occasion configured by the network device for the terminal device for the uplink channel transmission. Illustratively, the terminal device finally determines the actual transmission occasions for the uplink channel repetitive transmissions according to the nominal transmission occasion(s) configured by the network device and with reference to the beam switching time required to switch a beam direction.

Illustratively, the terminal device determines the first transmission resource and the second transmission resource according to a resource configuration of the uplink channel. The terminal device determines transmission resources in two ways, which are deleting and delaying. Deleting represents: at least one of the first transmission resource or the second transmission resource is determined by deleting the beam switching time. Delaying represents: the second transmission resource is determined by delaying the beam switching time behind the first transmission resource.

Illustratively, the network device sends the resource configuration of the uplink channel to the terminal device. The terminal device receives the resource configuration sent by the network device.

Illustratively, the repetitive transmissions of same data on the uplink channel include at least two times of repetitive transmissions. The two adjacent repetitive transmissions in step 220 refer to two adjacent repetitive transmissions requiring beam direction switching in the at least two times of repetitive transmissions.

For example, the terminal device needs to perform four times of repetitive transmissions, in a first repetitive transmission, a first beam direction is used to transmit to a first TRP; in a second repetitive transmission, the first beam direction is used to transmit to the first TRP; in a third repetitive transmission, a second beam direction is used to transmit to a second TRP; and in a fourth repetitive transmission, a third beam direction is used to transmit to a third TRP. Thus, the two adjacent repetitive transmissions in step 220 may include the second repetitive transmission and the third repetitive transmission, or include the third repetitive transmission and the fourth repetitive transmission.

Illustratively, an interval is presented between a first transmission occasion corresponding to the first transmission resource and a second transmission occasion corresponding to the second transmission resource, where the interval is greater than or equal to the beam switching time for switching the beam direction.

Illustratively, data transmitted in the uplink channel may include uplink data or uplink signaling.

Illustratively, the beam switching time is the time reserved for switching the beam direction by the terminal device, and the beam switching time is configured or pre-defined by the network device. The beam switching time may be different for different scenarios. For example, the beam switching time of a same panel or different panels of the terminal device may be different.

Step 240, a network device receives the two adjacent repetitive transmissions of the same data in the uplink channel on the first transmission resource and the second transmission resource, respectively.

Illustratively, the network device receives the two adjacent repetitive transmissions of the same data in the uplink channel on the first transmission resource and the second transmission resource through different TRPs, respectively.

As described above, according to the method provided by the present embodiment, by performing two adjacent repetitive transmissions of an uplink channel on two transmission resources with a beam switching time there between, respectively, the two repetitive transmissions use different transmitting beams to transmit to different TRPs of a base station, respectively. By spacing the two transmission resources with the beam switching time, it is fully considered that the terminal device needs to switch beams when using different beam directions to transmit to different TRPs on the uplink channel, the beam switching time is reserved for the beam switching, so that the terminal device achieves repetitive transmissions on the uplink channel to multiple TRPs of the base station.

Illustratively, the uplink channel may be a PUCCH (Physical Uplink Control Channel) or a PUSCH (Physical Uplink Shared Channel).

The uplink channel enhancement solution based on multi-TRP is mainly based on the PUCCH/PUSCH repetitive transmission solution of R16 (Release 16). The uplink transmission solution of R16 will be introduced first, that is, PUCCH only supports repetitive transmissions between time slots; PUSCH supports repetitive transmission type A mode between time slots, and also supports repetitive transmission type B mode, where transmissions span across time slots.

I. Intra-Slot Repetitive Transmissions of PUCCH

In R15 (Release 15)/16, considering uplink coverage, a mechanism of repetitive transmissions in multiple slots is introduced for PUCCH (corresponding to format 1/3/4 of PUCCH), and different PUCCH resources are transmitted at different transmission occasions of each slot according to a same transmission symbol length, as shown in FIG. 3 300. A PUCCH repetitive transmission can only use one PUCCH resource, and the PUCCH resource is configured with a beam direction spatialRelationInfo (spatial relationship information) and applied to all transmission occasions. The network device configures corresponding repetitive transmission times supported by a PUCCH format through RRC (Radio Resource Control) high-level signaling, and a range of the indicated repetitive transmission times is defined as {1,2,4,8}, and different PUCCH resources may correspond to different PUCCH formats.

II. Inter-Slot Repetitive Transmissions of PUSCH

There are two ways to enhance the uplink PUSCH repetitive transmission in the time domain: a repetitive type A transmission mode and a repetitive type B transmission mode introduced by R16.

1) PUSCH Repetitive Type a Transmission Mode

Slot aggregation PUSCH transmission in R16 is suitable for some situations with low delay requirement and high reliability requirement. A PUSCH is transmitted in K consecutive time slots, that is, K number of transmission occasions, starting from an S-th symbol in an initial slot, and each transmission occasion lasts for L symbols, while S+L will not exceed a slot boundary. For example, as shown in FIGS. 4 410, S=1 and L=4. The terminal device performs a first repetitive transmission in first to fourth symbols of a first slot, and performs a second repetitive transmission in first to fourth symbols of a second slot.

2) PUSCH Repetitive Type B Transmission Mode

In order to reduce delay and improve reliability, R16 supports the repeated transmission solution of PUSCH with Mini-slot (also known as "sub-slot") as a unit, and allows PUSCH transmission across time slots to further reduce the delay. In the time domain, one PUSCH starts to transmit on an S-th symbol in an initial slot, and continuously transmits K transmission occasions (nominal repetition), each transmission occasion occupies L symbols in a back-to-back manner, and S+L in transmission can exceed a slot boundary.

As shown in FIG. 5 412, when S=1 and L=4, the terminal device is configured to perform two repetitive transmissions on the uplink channel. The terminal device performs a first repetitive transmission in the first to fourth symbols of a first slot, and performs a second repetitive transmission in the fifth to eighth symbols of the first slot.

When the transmission occasion exceeds the slot boundary, the transmission will be re-divided.

As shown in FIG. 6 414, when S=1 and L=4, the terminal device is configured to perform four repetitive transmissions on the uplink channel. The terminal device performs a first repetitive transmission in the first to fourth symbols of a first slot, and performs a second repetitive transmission in fifth to eighth symbols of the first slot. According to configuration information, four symbols in a third repetitive transmission exceeds a slot boundary of the slot, thus, the third repetitive transmission is divided into two repetitive transmissions, a third repetitive transmission is performed in the ninth to tenth symbols of the first slot, and a fourth repetitive transmission is performed in the first to second symbols of a second slot. A fifth repetitive transmission is performed in third to sixth symbols of the second slot. That is, the terminal device actually performs five times of repetitive transmissions, and each of the repetitive transmissions transmits same data.

As shown in FIG. 7 416, when S=1 and L=14, the terminal device is configured to perform one repetitive transmission on the uplink channel. Since a slot length is 10 symbols, but each transmission occasion occupies 14 symbols, thus 14 symbols in a first repetitive transmission will exceed a slot boundary, and the first repetitive transmission is divided into two repetitive transmissions, a first repetitive transmission is performed in first to tenth symbols of a first slot, and a second repetitive transmission is performed in first to fourth symbols of a second slot. That is, the terminal device actually performs two times of repetitive transmissions, and each of the repetitive transmissions transmits the same data.

For the entire transmission, slot L*K represents a time-domain resource window length of a PUSCH transmission, and DL (Downlink) symbols are discarded and not used for the PUSCH transmission. The base station can configure a semi-static Flexible symbol of SFI (short elementary file identifier) as a dynamic UL (Uplink) symbol or a dynamic DL symbol, so that the semi-static Flexible symbol may be available or unavailable to PUSCH. When there are unavailable symbols, the terminal device needs to discard the unavailable symbols and then transmit on the remaining available symbols. The base station can also configure, through signaling, an invalid symbol pattern that a UE (User Equipment) cannot use, that is, the UE does not transmit uplink data on the invalid symbol indicated by signaling.

In standardization of R16, enhanced transmission solutions based on multi-point cooperative transmission adopted by the downlink PDSCH is mainly defined. The application of multi-TRP/PANEL in base station uses the cooperation between multiple TRPs or panels to transmit/receive data by channels from multiple angles, which can better overcome various occlusion/blocking effects, ensure robustness of link connection, and is suitable for the promotion of URL LC (Ultra Reliable Low Latency Communication) services. R17 needs to continue to use multi-TRP technology to enhance uplink transmission, including uplink control channel PUCCH and uplink data channel PUSCH. In R17 multi-TRP enhancement, PUCCH/PUSCH supports cooperative transmission of a same transport block (TB) to different TRP directions at different transmission occasions (TO) under the transmission mode defined above, so as to further apply spatial multiplexing transmission to improve transmission reliability.

For PUCCH channel transmission, the possible solutions of R17 enhancement are as follows:

I. Inter-Slot Repetitive Transmissions of PUCCH

With TDM (Time Division Multiplexing) repetitive transmission mode of R15/R16, time-sharing cooperative transmission on multiple time slots in multiple beam directions facing multiple TRPs can be realized.

II. Intra-Slot Repetitive Transmissions of PUCCH

That is, multiple beam directions facing multiple TRPs are transmitted in a time slot in a time-sharing joint way.

Figure 8:
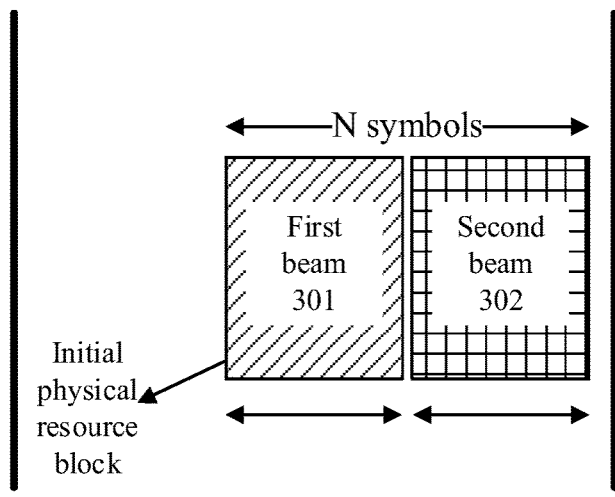
FIG. 8 is a schematic diagram showing repetitive transmissions of a PUCCH based on frequency hopping resources within a slot according to an uplink channel transmission method provided by an exemplary embodiment of the present application.

1) Intra-slot transmission solution based on sub-slots: That is, repetitive transmissions of PUCCH is performed by taking sub-slots in a slot as units. For example, as shown in FIG. 8, two times of repetitive transmissions of the uplink channel are performed within the slot, and same data is transmitted to different TRPs by using a first beam 301 and a second beam 302 respectively on two physical resource blocks with a same frequency domain within the slot.

Figure 9:
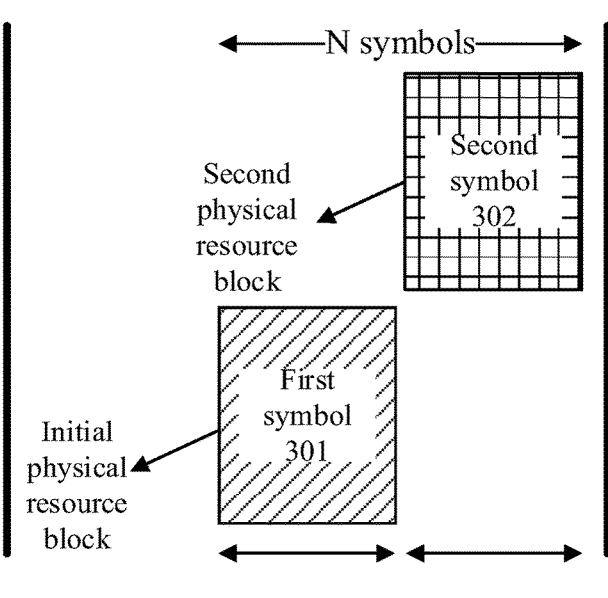
FIG. 9 is a schematic diagram showing repetitive transmissions of a PUCCH based on frequency hopping resources within a slot according to an uplink channel transmission method provided by an exemplary embodiment of the present application.

2) Intra-slot transmission solution based on hopping: That is, in a PUCCH resource, different symbol groups (or referred to as physical blocks) corresponding to a former and a latter hop within the slot correspond to different beam transmissions respectively. For example, as shown in FIG. 9, two times of repetitive transmissions of the uplink channel are performed within the slot, and same data is transmitted to different TRPs by using a first beam 301 and a second beam 302 respectively on two physical resource blocks with different frequency domains within the slot.

Many mapping schemes for the mapping relationship between the beam transmission directions of PUCCH/PUSCH with different TRP transmissions and different transmission occasions of the terminal device. Here are three typical schemes: Scheme a: period mapping. The two beam directions are cyclically mapped to a plurality of configured transmission occasions in turn. For example, when repetitive transmission is performed for four times, the beam direction mapping pattern can be #1 #2 #1 #2, where #1 corresponds to a first beam direction and #2 corresponds to a second beam direction.

Scheme b: consecutive mapping. The two beam directions are continuously and circularly mapped to a plurality of configured transmission occasions. For example, when repeated transmission is performed for four times, the beam direction mapping pattern can be #1 #1 #2 #2; and for four or more repetitive transmissions, the pattern is repeated, for example, for eight repetitive transmissions, the pattern of beam direction mapping can be #1 #1 #2 #2 #1 #1 #2 #2.

Scheme c: half mapping. The two beam directions are continuously mapped to a plurality of configured transmission occasions. For example, when the eight repetitive transmissions are performed, the beam direction mapping pattern can be #1 #1 #1 #1 #2 #2 #2 #2.

Ways to determine the first transmission resource and the second transmission resource with reference to the beam switching time by the terminal device include: deleting and delaying.

Deleting can be understood as deleting the beam switching time from the nominal transmission occasions to determine the two transmission resources. Delaying can be understood as delaying the nominal transmission occasion corresponding to the latter one of the repetitive transmissions by the beam switching time to obtain an actual transmission occasion.

With reference to the repetitive transmission mode of PUCCH within the slot and the repetitive type B transmission mode of PUSCH, at least the following twelve embodiments can be obtained.

(I) For repetitive transmissions based on sub-slots within a slot for a PUCCH, transmission resources are determined in a deleting way.

(II) For repetitive transmissions based on frequency-hopping resources within a slot for a PUCCH, transmission resources are determined by deleting the beam switching time from transmission resources of the two repetitive transmissions and then equally distributing.

(III) For repetitive transmissions based on frequency-hopping resources within a slot for a PUCCH, transmission resources are determined by deleting the beam switching time from the transmission resource corresponding to the second repetitive transmission.

(IV) For repetitive transmissions based on frequency-hopping resources within a slot for a PUCCH, transmission resources are determined by deleting the beam switching time from remaining available transmission resources within the slot and then equally distributing.

(V) For repetitive transmissions based on frequency-hopping resources within a slot for a PUCCH, transmission resources are determined by deleting the beam switching time from remaining available transmission resources within the slot and from transmission resources corresponding to the second repetitive transmission.

(VI) For repetitive transmissions of repetitive type B across a slot for a PUSCH, transmission resources are determined by deleting the beam switching time from transmission resources of the two repetitive transmissions and then equally distributing.

(VII) For repetitive transmissions based on sub-slots within a slot for a PUCCH, transmission resources are determined by delaying a sub-slot.

(VIII) For repetitive transmissions based on sub-slots within a slot for a PUCCH, transmission resources are determined by delaying the beam switching time.

(IX) For repetitive transmissions based on frequency-hopping resources within a slot for a PUCCH, transmission resources are determined by delaying transmission resources corresponding to the second repetitive transmission.

(X) For repetitive transmissions based on frequency-hopping resources within a slot for a PUCCH, transmission resources are determined by delaying transmission resources corresponding to the second repetitive transmission, and deleting transmission resources exceeding a slot boundary.

(XI) For repetitive transmissions of repetitive type B across a slot for a PUSCH, transmission resources are determined by delaying transmission resources corresponding to the second repetitive transmission.

(XII) Transmission resources are determined by configuring the beam switching time as an invalid symbol.

The above embodiments are not arranged in a particular sequence.

First, for embodiments (I)-(VI), the terminal device can determine the first transmission resource and the second transmission resource in a deleting way.

(I) For repetitive transmissions based on sub-slots within a slot for a PUCCH, transmission resources are determined in a deleting way.

Figure 10:
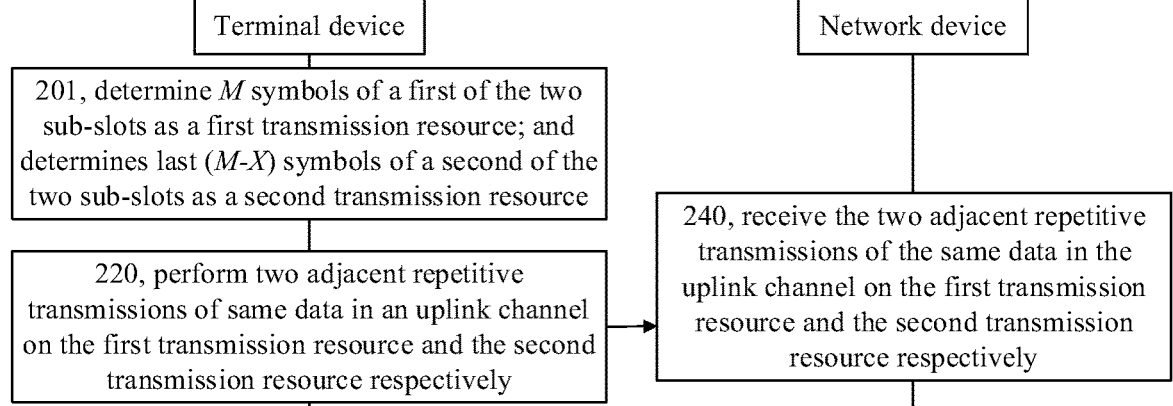
FIG. 10 is a flowchart of an uplink channel transmission method provided by an exemplary embodiment of the present application.

Referring to FIG. 10, FIG. 10 shows a flowchart of an uplink channel transmission method provided by an embodiment of the present application, where the method can be applied to the system architecture shown in FIG. 1.

The method is applied to a repetitive transmission of a PUCCH based on sub-slots within a slot; the resource configuration of the uplink channel includes: two consecutive sub-slots configured for the two adjacent repetitive transmissions; the beam switching time includes X symbols, each of the two sub-slots includes M symbols, X and M are positive integers, and X is smaller than or equal to M.

The method includes followings steps.

Step 201, a terminal device determines M symbols of a first of the two sub-slots as a first transmission resource; and determines last (M–X) symbols of a second of the two sub-slots as a second transmission resource.

It is taken as an example that two repetitive transmissions are performed within a slot, in accordance with the beam switching time, including X symbols, the terminal device deletes former X symbols from the second sub-slot corresponding to the second repetitive transmission.

Figure 11:
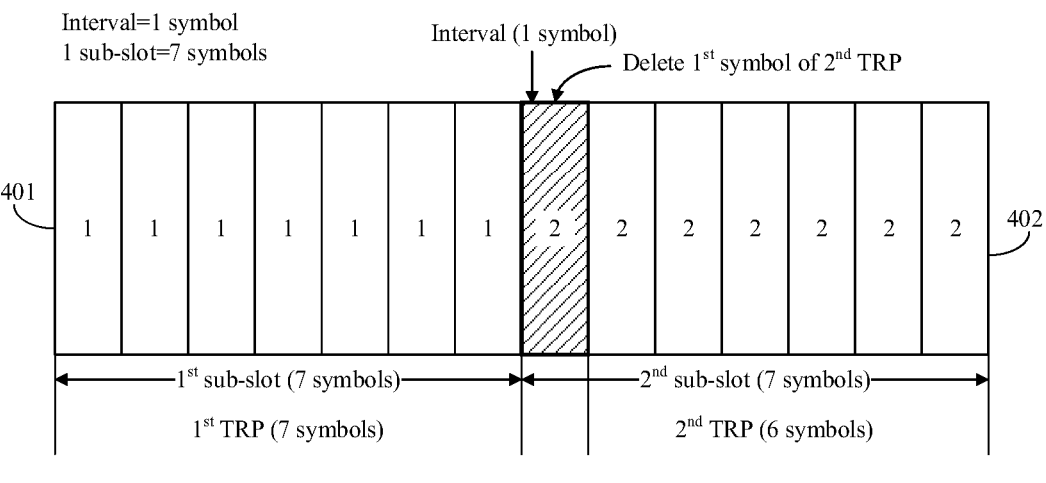
FIG. 11 is a schematic diagram of an uplink channel transmission method provided by an exemplary embodiment of the present application.

For example, as shown in FIG. 11, a sub-slot includes 7 symbols, and the beam switching time is 1 symbol. Then, 7 symbols in the first sub-slot within the slot are determined as the first transmission resource 401, and the first symbol is deleted from the second sub-slot within the slot as the beam switching time, and last 6 symbols in the second sub-slot are determined as the second transmission resource 402.

In an optional implementation, the terminal device can also determine former (M-X) symbols in the first of the two sub-slots as the first transmission resource; and determine M symbols of the second of the two sub-slots as the second transmission resource.

Step 220, the terminal device performs two adjacent repetitive transmissions of same data in an uplink channel on the first transmission resource and the second transmission resource respectively.

Step 240, a network device receives the two adjacent repetitive transmissions of the same data in the uplink channel on the first transmission resource and the second transmission resource respectively.

As described above, according to the method provided by the present embodiment, by deleting the beam switching time from transmission resources corresponding to the second repetitive transmission, the terminal device sends data of the second repetitive transmission on the remaining transmission resources, thereby achieving that the terminal device performs repetitive transmissions on the uplink channel facing multiple TRPs of a base station.

(II) For repetitive transmissions based on frequency-hopping resources within a slot for a PUCCH, transmission resources are determined by deleting the beam switching time from transmission resources of the two repetitive transmissions and then equally distributing.

Figure 12:
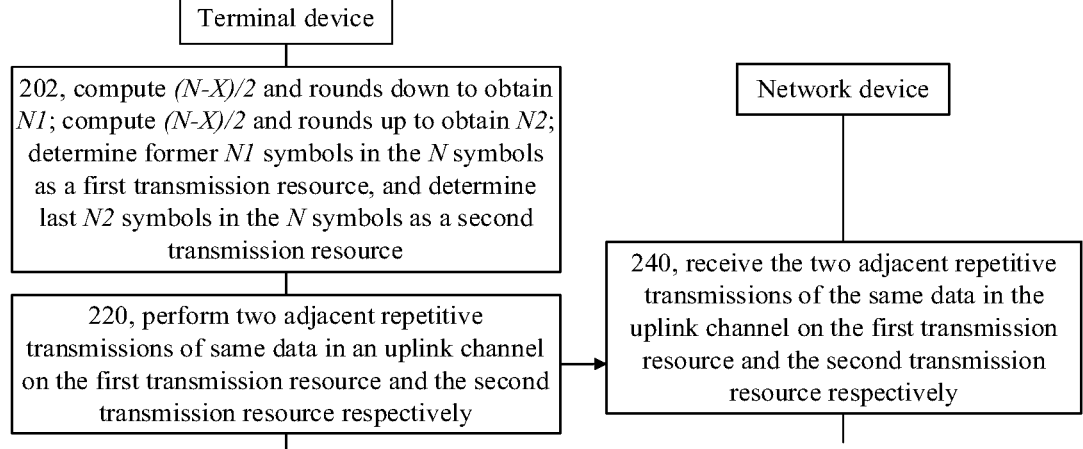
FIG. 12 is a flowchart of an uplink channel transmission method provided by an exemplary embodiment of the present application.

Referring to FIG. 12, FIG. 12 shows a flowchart of an uplink channel transmission method provided by an embodiment of the present application, where the method can be applied to the system architecture shown in FIG. 1.

The method is applied to a repetitive transmission of a PUCCH based on a PUCCH resource within a slot; the resource configuration of the uplink channel includes: N symbols configured for the two adjacent repetitive transmissions on the PUCCH resource, the beam switching time includes X symbols, X is a positive integer, N is an integer greater than 1, and X is smaller than or equal to N.

The method includes followings steps.

Step 202, a terminal device computes (N−X)/2 and rounds down to obtain N1; computes (N−X)/2 and rounds up to obtain N2; determines former N1 symbols in the N symbols as a first transmission resource, and determines last N2 symbols in the N symbols as a second transmission resource.

It is taken as an example that two repetitive transmissions are performed within a slot, the terminal device takes that the beam switching time as X symbols, computes symbols equally occupied by the two transmission resources after X symbols are deleted from the N symbols configured for the two repetitive transmissions, and determines the first transmission resource and the second transmission resource according to the computed symbols.

Figure 13:
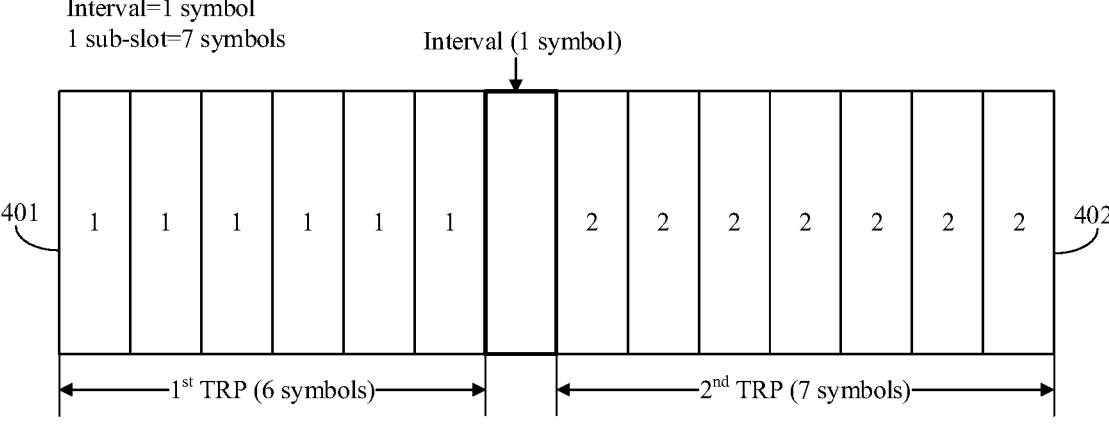
FIG. 13 is a schematic diagram of an uplink channel transmission method provided by an exemplary embodiment of the present application.

For example, as shown in FIG. 13, when N is 14, and the beam switching time is 1 symbol. (N−X)/2 is rounded down to obtain 6, (N−X)/2 is rounded up to obtain 7, and the first to sixth symbols within the slot are determined as the first transmission resource 401, a seventh symbol is taken as the beam switching time, and the eighth to fourteenth symbols within the slot are determined as the second transmission resource 402.

In an optional implementation, the terminal device can also compute (N−X)/2 and round down to obtain N1; compute (N−X)/2 and round up to obtain N2; determine the former N2 symbols in the N symbols as the first transmission resource, and determine the last N1 symbols in the N symbols as the second transmission resource.

For example, as shown in FIG. 14, when N is 14, and the beam switching time is 1 symbol. (N−X)/2 is rounded down to obtain 6, (N−X)/2 is rounded up to obtain 7, and the first to seventh symbols within the slot are determined as the first transmission resource 401, an eighth symbol is taken as the beam switching time, and the ninth to fourteenth symbols within the slot are determined as the second transmission resource 402.

Step 220, the terminal device performs two adjacent repetitive transmissions of the same data in an uplink channel on the first transmission resource and the second transmission resource, respectively.

Step 240, a network device receives the two adjacent repetitive transmissions of the same data in the uplink channel on the first transmission resource and the second transmission resource, respectively.

As described above, according to the method provided by the present embodiment, by deleting the beam switching time from N symbols configured for the two repetitive transmissions, and equally distributing remaining symbols to the two repetitive transmissions to obtain numbers of symbols occupied by the two transmission resources respectively, and determining the two transmission resources in the N symbols respectively, it is achieved that the terminal device performs repetitive transmissions on the uplink channel facing multiple TRPs of a base station.

(III) For repetitive transmissions based on frequency-hopping resources within a slot for a PUCCH, transmission resources are determined by deleting the beam switching time from the transmission resource corresponding to the second repetitive transmission.

Referring to FIG. 15, it shows a flowchart of an uplink channel transmission method provided by an embodiment of the present application, where the method can be applied to the system architecture shown in FIG. 1.

The method is applied to a repetitive transmission of a PUCCH based on a PUCCH resource within a slot; the resource configuration of the uplink channel includes: N symbols configured for the two adjacent repetitive transmissions on the PUCCH resource, the beam switching time includes X symbols, X is a positive integer, N is an integer greater than 1, and X is smaller than N.

The method includes followings steps.

Step 203, a terminal device computes N/2 and rounds down to obtain N3; computes N/2 and rounds up to obtain N4; determines the former N3 symbols in the N symbols as a first transmission resource, and determines the last (N4−X) symbols in the N symbols as a second transmission resource.

It is taken as an example that two repetitive transmissions are performed within a slot, the terminal device takes that the beam switching time as X symbols, equally distributes the N symbols configured for the two repetitive transmissions to the two repetitive transmissions, to obtain numbers of symbols occupied by the two repetitive transmissions respectively, and then deletes the beam switching time from the symbols occupied by the second repetitive transmission, to obtain the first transmission resource and the second transmission resource.

For example, as shown in FIG. 16, when N is 14, and the beam switching time is 1 symbol. N/2 is rounded down to obtain 7, N/2 is rounded up to obtain 7, and first to seventh symbols within the slot are determined as the first transmission resource 401, an eighth symbol is taken as the beam switching time, and the ninth to fourteenth symbols within the slot are determined as the second transmission resource 402.

In an optional implementation, the terminal device can also compute N/2 and round down to obtain N3; compute N/2 and round up to obtain N4; determine former (N3-X) symbols in the N symbols as the first transmission resource, and determine last N4 symbols in the N symbols as the second transmission resource.

In an optional implementation, the terminal device can also compute N/2 and round down to obtain N3; compute N/2 and round up to obtain N4; determine the former N4 symbols in the N symbols as the first transmission resource, and determine the last (N3−X) symbols in the N symbols as the second transmission resource.

In an optional implementation, the terminal device can also compute N/2 and round down to obtain N3; compute N/2 and round up to obtain N4; determine former (N4-X) symbols in the N symbols as the first transmission resource, and determine last N3 symbols in the N symbols as the second transmission resource.

Step 220, the terminal device performs two adjacent repetitive transmissions of the same data in an uplink channel on the first transmission resource and the second transmission resource, respectively.

Step 240, a network device receives the two adjacent repetitive transmissions of the same data in the uplink channel on the first transmission resource and the second transmission resource, respectively.

As described above, according to the method provided by the present embodiment, by computing average numbers of symbols occupied by each time of transmission according to the N symbols configured for the two repetitive transmissions, and deleting the beam switching time from a number of symbols occupied by the second repetitive transmission, the first transmission resource and the second transmission resource are determined, so as to achieve that the terminal device performs repetitive transmissions on the uplink channel facing multiple TRPs of a base station.

(IV) For repetitive transmissions based on frequency-hopping resources within a slot for a PUCCH, transmission resources are determined by deleting the beam switching time from the remaining available transmission resources within the slot and then equally distributing.

Referring to FIG. 17, FIG. 17 shows a flowchart of an uplink channel transmission method provided by an embodiment of the present application, where the method can be applied to the system architecture shown in FIG. 1.

The method is applied to a repetitive transmission of a PUCCH based on a PUCCH resource within a slot; the resource configuration of the uplink channel includes: N symbols configured for the two adjacent repetitive transmissions on the PUCCH resource, and Y symbols are presented between a last symbol of the N symbols and a first symbol in a next slot; the beam switching time includes X symbols and Y are positive integers, and N is an integer greater than 1.

The method includes followings steps.

Step 204, a terminal device computes (Y+N−X)/2 and rounds down to obtain N5; computes (Y+N−X)/2 and rounds up to obtain N6; determines former N5 symbols in the (N+Y) symbols as the first transmission resource, and determines last N6 symbols in the (N+Y) symbols as the second transmission resource.

It is taken as an example that two repetitive transmissions are performed within a slot, the terminal device takes that the beam switching time as X symbols, computes symbols equally occupied by the two transmission resources after X symbols are deleted from the N symbols configured for the two repetitive transmissions and the Y symbols to an end of the slot, and determines the first transmission resource and the second transmission resource according to the computed symbols.

For example, as shown in FIG. 18, when N is 14, and the beam switching time is 1 symbol, a total of 9 symbols from a fifth symbol to a thirteenth symbol within the slot are configured for the two adjacent repetitive transmissions. (Y+N−X)/2 is rounded down to obtain 4, (Y+N−X)/2 is rounded up to obtain 5, and the first to fifth symbols within the slot are determined as the first transmission resource 401, a ninth symbol is taken as the beam switching time, and the tenth to fourteenth symbols within the slot are determined as the second transmission resource 402.

In an optional implementation, the terminal device can also compute (Y+N−X)/2 and round down to obtain N5; compute (Y+N−X)/2 and round up to obtain N6; determine former N6 symbols in the (N+Y) symbols as the first transmission resource, and determine last N5 symbols in the (N+Y) symbols as the second transmission resource.

Step 220, the terminal device performs two adjacent repetitive transmissions of the same data in an uplink channel on the first transmission resource and the second transmission resource, respectively.

Step 240, a network device receives the two adjacent repetitive transmissions of the same data in the uplink channel on the first transmission resource and the second transmission resource, respectively.

As described above, according to the method provided by the present embodiment, by deleting the beam switching time from the remaining available (N+Y) symbols within the slot, and computing number of symbols occupied by the two repetitive transmissions respectively, the first transmission resource and the second transmission resource are determined, to achieve that the terminal device performs repetitive transmissions on the uplink channel facing multiple TRPs of a base station.

(V) For repetitive transmissions based on frequency-hopping resources within a slot for a PUCCH, transmission resources are determined by deleting the beam switching time from remaining available transmission resources within the slot and from transmission resources corresponding to the second repetitive transmission.

Figure 19:
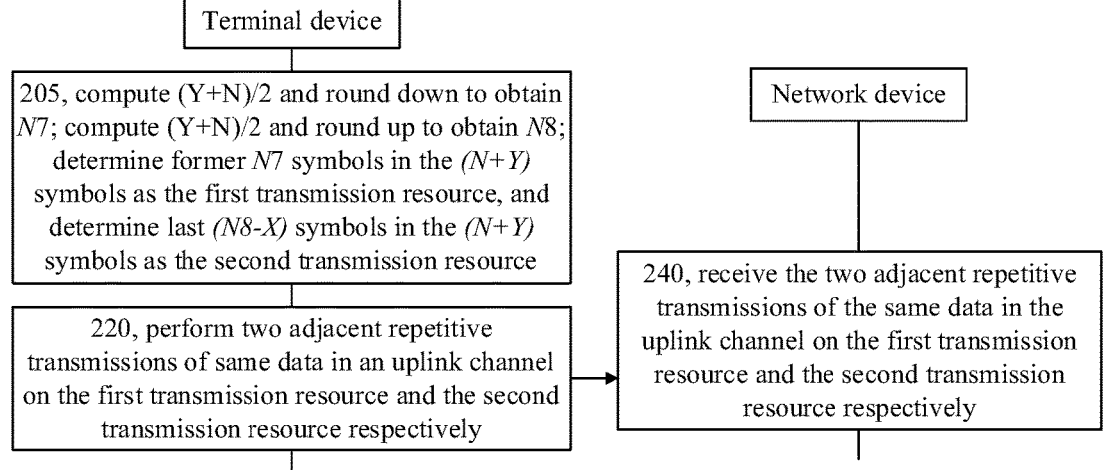
FIG. 19 is a flowchart of an uplink channel transmission method provided by an exemplary embodiment of the present application.

Referring to FIG. 19, it shows a flowchart of an uplink channel transmission method provided by an embodiment of the present application, where the method can be applied to the system architecture shown in FIG. 1.

The method is applied to a repetitive transmission of a PUCCH based on a PUCCH resource within a slot; the resource configuration of the uplink channel includes: N symbols configured for the two adjacent repetitive transmissions on the PUCCH resource, and Y symbols are presented between a last symbol of the N symbols and a first symbol in a next slot; the beam switching time includes X symbols and Y are positive integers, and N is an integer greater than 1.

The method includes followings steps.

Step 205, a terminal device computes (Y+N)/2 and rounds down to obtain N7; computes (Y+N)/2 and rounds up to obtain N8; determines former N7 symbols in the (N+Y) symbols as the first transmission resource, and determines last (N8−X) symbols in the (N+Y) symbols as the second transmission resource.

It is taken as an example that two repetitive transmissions are performed within a slot, the terminal device takes that the beam switching time as X symbols, computes an average number of symbols of the N+Y symbols including the N symbols configured for the two repetitive transmissions and the Y symbols to the end of the slot, and deletes the beam switching time from the number of symbols corresponding to the second repetitive transmission, so as to determine the first transmission resource and the second transmission resource.

Figure 20:
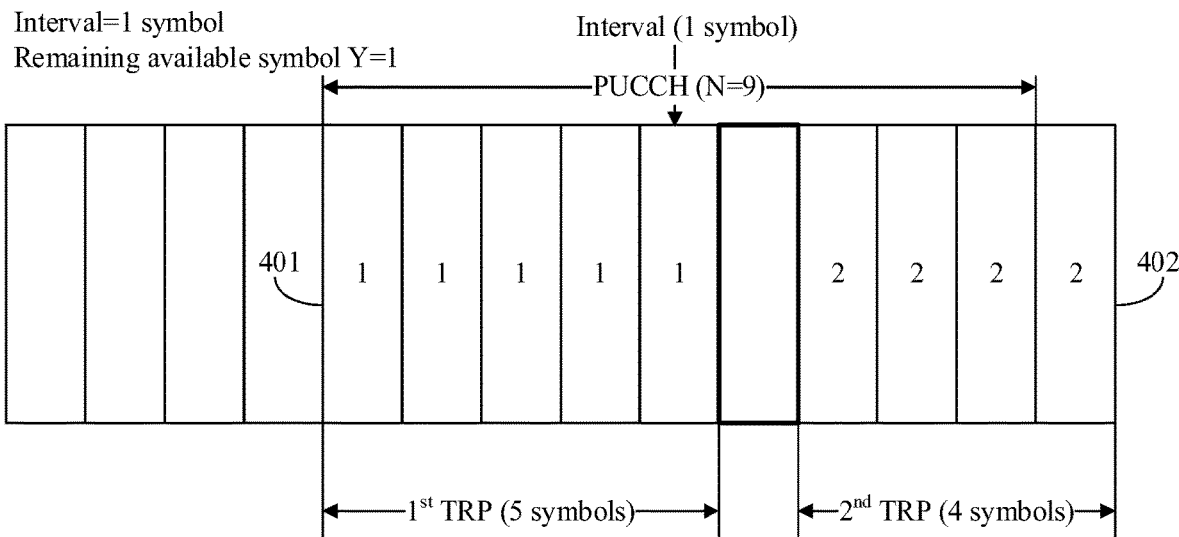
FIG. 20 is a schematic diagram of an uplink channel transmission method provided by an exemplary embodiment of the present application.

For example, as shown in FIG. 20, when N is 14, and the beam switching time is 1 symbol, a total of 9 symbols from a fifth symbol to a thirteenth symbol within the slot are configured for the two adjacent repetitive transmissions. (Y+N)/2 is rounded down to obtain 5, (Y+N)/2 is rounded up to obtain 5, and the fifth to ninth symbols within the slot are determined as the first transmission resource 401, a tenth symbol is taken as the beam switching time, and the eleventh to fourteenth symbols within the slot are determined as the second transmission resource 402.

In an optional implementation, the terminal device can also compute (Y+N)/2 and round down to obtain N7; compute (Y+N)/2 and round up to obtain N8; determine former N8 symbols in the (N+Y) symbols as the first transmission resource, and determine last (N7−X) symbols in the (N+Y) symbols as the second transmission resource.

In an optional implementation, the terminal device can also compute (Y+N)/2 and round down to obtain N7; compute (Y+N)/2 and round up to obtain N8; determine former (N8−X) symbols in the (N+Y) symbols as the first transmission resource, and determine last N7 symbols in the (N+Y) symbols as the second transmission resource.

In an optional implementation, the terminal device can also compute (Y+N)/2 and round down to obtain N7; compute (Y+N)/2 and round up to obtain N8; determine former (N7−X) symbols in the (N+Y) symbols as the first transmission resource, and determine last N8 symbols in the (N+Y) symbols as the second transmission resource.

Step 220, the terminal device performs two adjacent repetitive transmissions of same data in an uplink channel on the first transmission resource and the second transmission resource respectively.

Step 240, a network device receives the two adjacent repetitive transmissions of the same data in the uplink channel on the first transmission resource and the second transmission resource, respectively.

As described above, according to the method provided by the present embodiment, by computing average numbers of symbols occupied by the two repetitive transmissions according to the remaining available N+Y symbols within the slot, and deleting the beam switching time from a number of symbols occupied by the second repetitive transmission, the first transmission resource and the second transmission resource are determined, so as to achieve that the terminal device performs repetitive transmissions on the uplink channel facing multiple TRPs of a base station.

> (VI) For repetitive transmissions of repetitive type B across a slot for a PUSCH, transmission resources are determined by deleting the beam switching time from transmission resources of the two repetitive transmissions and then equally distributing.

Referring to FIG. 21, FIG. 21 shows a flowchart of an uplink channel transmission method provided by an embodiment of the present application, where the method can be applied to the system architecture shown in FIG. 1.

The method is applied to repetitive transmission of a PUSCH with a cross-slot transmissible capability and configured based on a nominal transmission occasion; the resource configuration of the uplink channel includes: two consecutive nominal transmission occasions configured for the two adjacent repetitive transmissions, each of the nominal transmission occasions occupies time-domain resources of A symbols, the beam switching time includes X symbols, and X and A are positive integers.

The method includes followings steps.

Step 206, a terminal device determines A symbols of a former one of the two nominal transmission occasions as a first transmission resource; determines last (A–X) symbols of a latter one of the two nominal transmission occasions as a second transmission resource.

Illustratively, according to the beam switching time including X symbols and two nominal transmission occasions configured for the two repetitive transmissions, a terminal device deletes the beam switching time from the nominal transmission occasion corresponding to the second repetitive transmission, to determine the first transmission resource and the second transmission resource.

For example, as shown in FIG. 22, when each of the nominal transmission occasions occupies 4 symbols, and the beam switching time is 1 symbol, a first nominal transmission occasion and a second nominal transmission occasion are configured to the two adjacent repetitive transmissions. The first nominal transmission occasion is determined as the first transmission resource 401, and a first symbol of the second nominal transmission occasion is determined as the beam switching time, and the last 3 symbols of the second nominal transmission occasion are determined as the second transmission resource 402.

In an optional implementation, the terminal device can also determine former (A-X) symbols in the first of the two nominal transmission occasions as the first transmission resource; and determine A symbols of the second of the two nominal transmission occasions as the second transmission resource.

Optionally, when PUSCH transmission is repeated for multiple times, for each two of the adjacent repetitive transmissions requiring beam direction switching, the beam switching time is deleted from the head of the nominal transmission occasion corresponding to a latter one of the repetitive transmissions.

For example, as shown in FIG. 23 418, the terminal device is configured to perform 4 times of PUSCH repetitive transmissions, where a first nominal repetitive transmission and a third nominal repetitive transmission are directed to a first TRP of a first beam direction, and a second nominal repetitive transmission and a fourth nominal repetitive transmission are directed to a second TRP of a second beam direction. Since each nominal transmission occasion occupies 4 symbols, and each slot includes 10 symbols, then a third nominal repetitive transmission occasion will exceed a slot boundary, thus the terminal device will divide the third nominal repetitive transmission into two actual repetitive transmissions, and the terminal actually needs to perform 5 times of actual repetitive transmissions, that is, a first nominal repetitive transmission is a first actual repetitive transmission, a second nominal repetitive transmission is a second actual repetitive transmission, a third nominal repetitive transmission includes a third actual repetitive transmission and a fourth actual repetitive transmission, and a fourth nominal repetitive transmission is a fifth actual repetitive transmission. Therefore, actual repetitive transmissions requiring beam direction switching include: the first actual repetitive transmission and the second actual repetitive transmission, the second actual repetitive transmission and the third actual repetitive transmission, the fourth actual repetitive transmission and the fifth actual repetitive transmission. Thus, the terminal device deletes X symbols from the nominal transmission occasion corresponding to a latter actual repetitive transmission of the two adjacent repetitive transmissions (actual repetitive transmissions) requiring beam switching, to obtain the beam switching time. When X=1, a first transmission resource used by the first actual repetitive transmission is first to fourth symbols of a first slot; a fifth symbol of the first slot is the beam switching time, a second transmission resource used by the second actual repetitive transmission is sixth to eighth symbols of the first slot; a ninth symbol of the first slot is the beam switching time, a third transmission resource used by the third actual repetitive transmission is a tenth symbol of the first slot; a fourth transmission resource used by the fourth actual repetitive transmission is first to second symbols of a second slot; a third symbol of the second slot is the beam switching time, a fifth transmission resource used by the fifth actual repetitive transmission is fourth to sixth symbols of the second slot.

Step 220, the terminal device performs two adjacent repetitive transmissions of the same data in an uplink channel on the first transmission resource and the second transmission resource, respectively.

Step 240, a network device receives the two adjacent repetitive transmissions of the same data in the uplink channel on the first transmission resource and the second transmission resource, respectively.

As described above, according to the method provided by the present embodiment, by deleting the beam switching time from the nominal transmission occasion corresponding to a latter one of the repetitive transmissions of the PUSCH, it is achieved that the terminal device performs repetitive transmissions on the uplink channel facing multiple TRPs of a base station.

Afterwards, for embodiments (VII)-(XII), the terminal device can determine the first transmission resource and the second transmission resource in a delaying way.

(VII) For repetitive transmissions based on sub-slots within a slot for a PUCCH, transmission resources are determined by delaying a sub-slot.

Figure 24:
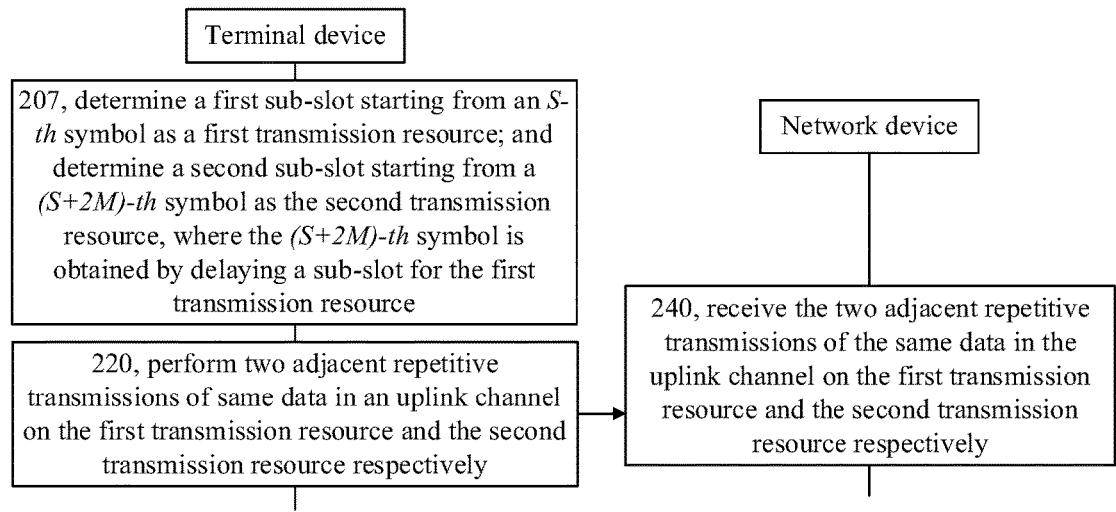
FIG. 24 is a flowchart of an uplink channel transmission method provided by an exemplary embodiment of the present application.

Referring to FIG. 24, FIG. 24 shows a flowchart of an uplink channel transmission method provided by an embodiment of the present application, where the method can be applied to the system architecture shown in FIG. 1.

The method is applied to a repetitive transmission of a PUCCH based on sub-slots within a slot; the resource configuration of the uplink channel includes: two consecutive sub-slots configured for the two adjacent repetitive transmissions; the beam switching time includes X symbols, each of the two sub-slots includes M symbols, X and M are positive integers, and X is smaller than or equal to M; an initial symbol configured for the two adjacent repetitive transmissions is an S-th symbol within the slot, and S is a positive integer.

The method includes followings steps.

Step 207, a terminal device determines a first sub-slot starting from an S-th symbol as a first transmission resource; and determines a second sub-slot starting from a (S+2M)-th symbol as the second transmission resource, where the (S+2M)-th symbol is obtained by delaying a sub-slot for the first transmission resource.

It is taken as an example that two repetitive transmissions are performed within a slot, the terminal device takes the beam switching time as X symbols, and delays a sub-slot corresponding to the second repetitive transmission by a sub-slot, and the delayed sub-slot is taken as the beam switching time.

Figure 25:
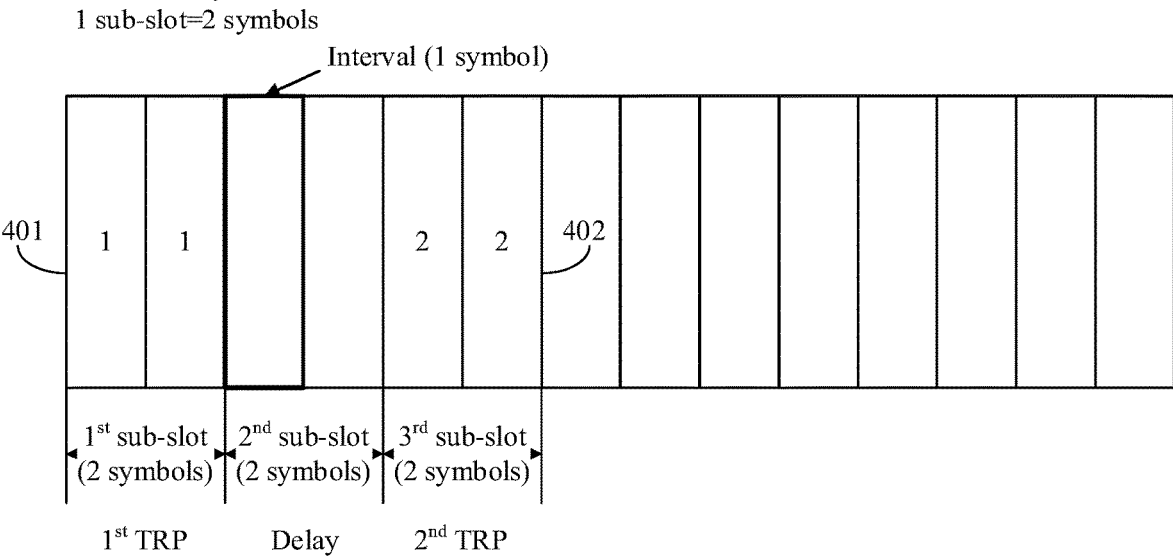
FIG. 25 is a schematic diagram of an uplink channel transmission method provided by an exemplary embodiment of the present application.

For example, as shown in FIG. 25, when each sub-slot includes 2 symbols, beam switching time is 1 symbol, and S=1, then a first sub-slot within the slot is determined as the first transmission resource 401, a second sub-slot is determined as the beam switching time, and a third sub-slot is determined as the second transmission resource 402.

Illustratively, after a sub-slot is delayed, the second sub-slot of the second repetitive transmission may exceed a slot boundary of the slot, thus symbols of the second sub-slot exceeding the slot boundary need to be deleted, and the cut second sub-slot is taken as the second transmission resource. That is, in response to that last Z symbols in the second sub-slot starting from the (S+2M)-th symbol exceed a slot boundary of the slot, the terminal device determines former (M−Z) symbols in the second sub-slot as the second transmission resource, where Z is a positive integer smaller than M.

For example, as shown in FIG. 26, when a slot includes 5 symbols, each of sub-slots includes 2 symbols, beam switching time is 1 symbol, and S=1, then a first sub-slot within the slot is determined as the first transmission resource 401, a second sub-slot is determined as the beam switching time, and a first symbol in a third sub-slot is determined as the second transmission resource 402.

Step 220, the terminal device performs two adjacent repetitive transmissions of the same data in an uplink channel on the first transmission resource and the second transmission resource, respectively.

Step 240, a network device receives the two adjacent repetitive transmissions of the same data in the uplink channel on the first transmission resource and the second transmission resource, respectively.

As described above, according to the method provided by the present embodiment, by delaying a sub-slot for beam switching behind the first sub-slot of the first repetitive transmission, the third sub-slot is determined as the second transmission resource of the second repetitive transmission, so as to achieve that the terminal device performs repetitive transmissions on the uplink channel facing multiple TRPs of a base station.

(VIII) For repetitive transmissions based on sub-slots within a slot for a PUCCH, transmission resources are determined by delaying the beam switching time.

Referring to FIG. 27, it shows a flowchart of an uplink channel transmission method provided by an embodiment of the present application, where the method can be applied to the system architecture shown in FIG. 1.

The method is applied to a repetitive transmission of a PUCCH based on sub-slots within a slot; the resource configuration of the uplink channel includes: two consecutive sub-slots configured for the two adjacent repetitive transmissions; the beam switching time includes X symbols, each of the two sub-slots includes M symbols, X and M are positive integers, and X is smaller than or equal to M; an initial symbol configured for the two adjacent repetitive transmissions is an S-th symbol within the slot, and S is a positive integer.

The method includes followings steps.

Step 208, a terminal device determines a first sub-slot starting from an S-th symbol as a first transmission resource; and determines a second sub-slot starting from a (S+M+X)-th symbol as the second transmission resource, where the (S+M+X)-th symbol is obtained by delaying X symbols for the first transmission resource.

It is taken as an example that two repetitive transmissions are performed within a slot, the terminal device takes the beam switching time as X symbols, and delays a sub-slot corresponding to the second repetitive transmission by the beam switching time, and determines the second transmission resource of the second repetitive transmission.

Figure 28:
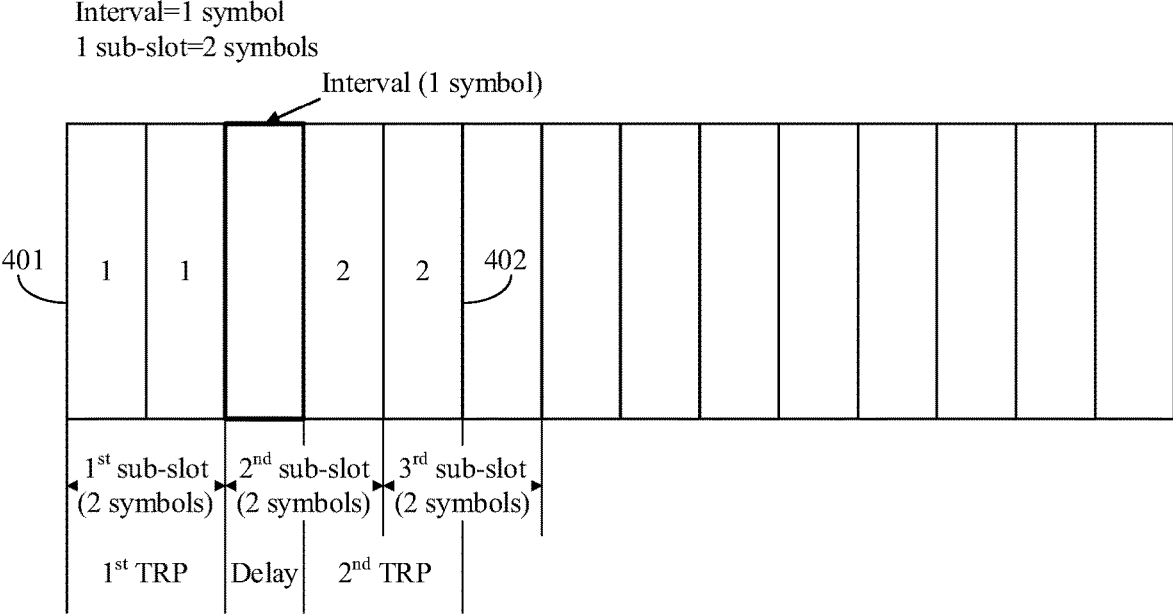
FIG. 28 is a schematic diagram of an uplink channel transmission method provided by an exemplary embodiment of the present application.

For example, as shown in FIG. 28, when each of sub-slots includes 2 symbols, beam switching time is 1 symbol, and S=1, then a first sub-slot within the slot is determined as the first transmission resource 401, a first symbol of a second sub-slot is determined as the beam switching time, and a second sub-slot consisted of a second symbol of the second sub-slot and a first symbol of a third sub-slot is determined as the second transmission resource 402.

Illustratively, after a sub-slot is delayed, the second sub-slot of the second repetitive transmission may exceed a slot boundary of the slot, thus symbols of the second sub-slot exceeding the slot boundary need to be deleted, and the cut second sub-slot is taken as the second transmission resource. That is, in response to that last Z symbols in the second sub-slot starting from the (S+M+X)-th symbol exceed a slot boundary of the slot, the terminal device determines the former (M−Z) symbols in the second sub-slot as the second transmission resource, where Z is a positive integer smaller than M.

Figure 29:
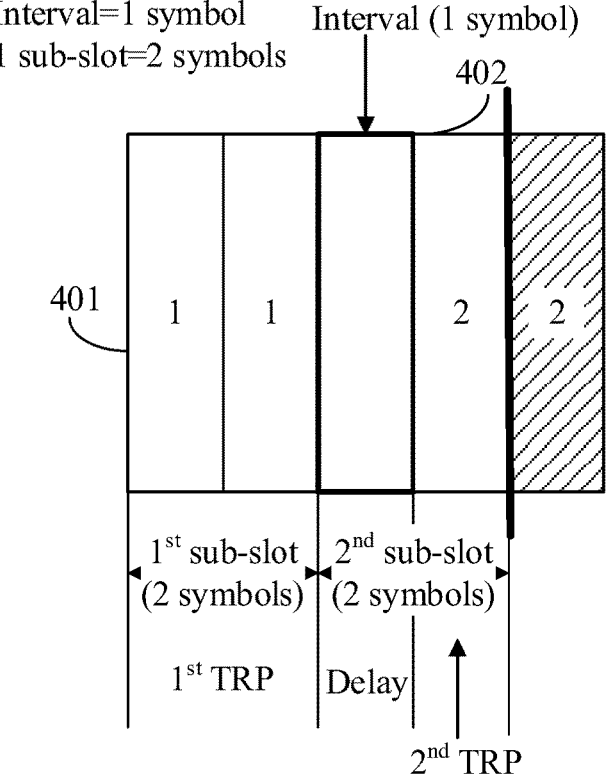
FIG. 29 is a schematic diagram of an uplink channel transmission method provided by an exemplary embodiment of the present application.

For example, as shown in FIG. 29, when a slot includes 4 symbols, each of sub-slots includes 2 symbols, beam switching time is 1 symbol, and S=1, then a first sub-slot within the slot is determined as the first transmission resource 401, a first symbol of a second sub-slot is determined as the beam switching time, and a second symbol in the second sub-slot is determined as the second transmission resource 402.

Step 220, the terminal device performs two adjacent repetitive transmissions of the same data in an uplink channel on the first transmission resource and the second transmission resource, respectively.

Step 240, a network device receives the two adjacent repetitive transmissions of the same data in the uplink channel on the first transmission resource and the second transmission resource, respectively.

As described above, according to the method provided by the present embodiment, by delaying the beam switching time behind the first sub-slot of the first repetitive transmission, a sub-slot after delaying the beam switching time is determined as the second transmission resource of the second repetitive transmission, so as to achieve that the terminal device performs repetitive transmissions on the uplink channel facing multiple TRPs of a base station.

(IX) For repetitive transmissions based on frequency-hopping resources within a slot for a PUCCH, transmission resources are determined by delaying transmission resources corresponding to the second repetitive transmission.

Referring to FIG. 30, it shows a flowchart of an uplink channel transmission method provided by an embodiment of the present application, where the method can be applied to the system architecture shown in FIG. 1.

The method is applied to a repetitive transmission of a PUCCH based on a PUCCH resource within a slot; the resource configuration of the uplink channel includes: N symbols configured for the two adjacent repetitive transmissions on the PUCCH resource, and Y symbols are presented between a last symbol of the N symbols and a first symbol in a next slot; the beam switching time includes X symbols, X, Y and N are positive integers, and X is smaller than or equal to Y; an initial symbol configured for the two adjacent repetitive transmissions is an S-th symbol within the slot, and S is a positive integer.

The method includes followings steps.

Step 209, a terminal device computes N/2 and rounds down to obtain N3; computes N/2 and rounds up to obtain N4; determines N3 symbols starting from the S-th symbol as a first transmission resource; determines N4 symbols starting from a (S+N3+X)-th symbol as a second transmission resource, where the (S+N3+X)-th symbol is obtained by delaying X symbols for the first transmission resource.

It is taken as an example that two repetitive transmissions are performed within a slot, the terminal device takes that the beam switching time as X symbols, computes numbers of symbols occupied by the two repetitive transmissions respectively in the N symbols, determines a number of symbols corresponding to the first repetitive transmission as the first transmission resource, determines X symbols behind the first transmission resource as the beam switching time, and determines a number of symbols corresponding to the second repetitive transmission behind the beam switching time as the second transmission resource.

For example, as shown in FIG. 31, the beam switching time is 1 symbol, S=5, N=9 and Y=1, then N/2 is rounded down to obtain 4, N/2 is rounded up to obtain 5, and fifth to eighth symbols within the slot are determined as the first transmission resource 401, a ninth symbol is taken as the beam switching time, and tenth to fourteenth symbols within the slot are determined as the second transmission resource 402.

Step 220, the terminal device performs two adjacent repetitive transmissions of the same data in an uplink channel on the first transmission resource and the second transmission resource, respectively.

Step 240, a network device receives the two adjacent repetitive transmissions of the same data in the uplink channel on the first transmission resource and the second transmission resource, respectively.

As described above, according to the method provided by the present embodiment, by equally distributing the N symbols corresponding to the two repetitive transmission to obtain a number of symbols corresponding to each transmission, determining a number of symbols corresponding to the first repetitive transmission starting from an initial symbol of the two adjacent repetitive transmissions as the first transmission resource, delaying the beam switching time, and determining a number of symbols corresponding to the second repetitive transmission delayed by the beam switching time as the second transmission resource, it is achieved that the terminal device performs repetitive transmissions on the uplink channel facing multiple TRPs of a base station.

(X) For repetitive transmissions based on frequency-hopping resources within a slot for a PUCCH, transmission resources are determined by delaying transmission resources corresponding to the second repetitive transmission, and deleting transmission resources exceeding a slot boundary.

Figure 32:
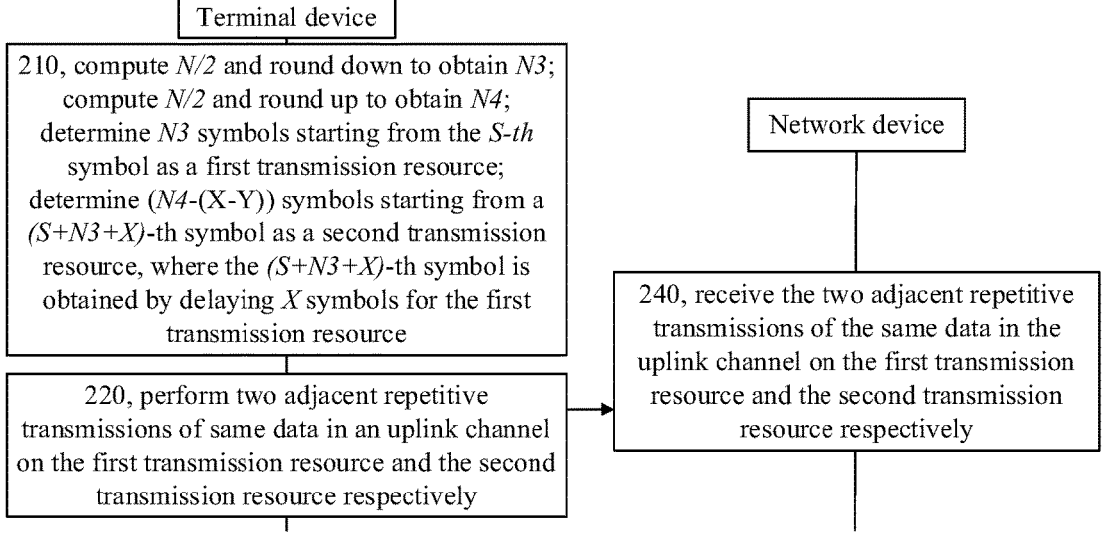
FIG. 32 is a flowchart of an uplink channel transmission method provided by an exemplary embodiment of the present application.

Referring to FIG. 32, FIG. 32 shows a flowchart of an uplink channel transmission method provided by an embodiment of the present application, where the method can be applied to the system architecture shown in FIG. 1.

The method is applied to a repetitive transmission of a PUCCH based on a PUCCH resource within a slot; the resource configuration of the uplink channel includes: N symbols configured for the two adjacent repetitive transmissions on the PUCCH resource, and Y symbols are presented between a last symbol of the N symbols and a first symbol in a next slot; the beam switching time includes X symbols, X, Y and N are positive integers, and X is greater than or equal to Y; an initial symbol configured for the two adjacent repetitive transmissions is an S-th symbol within the slot, and S is a positive integer.

The method includes followings steps.

Step 210, a terminal device computes N/2 and rounds down to obtain N3; computes N/2 and rounds up to obtain N4; determines N3 symbols starting from the S-th symbol as a first transmission resource; determines (N4−(X−Y)) symbols starting from a (S+N3+X)-th symbol as a second transmission resource, where the (S+N3+X)-th symbol is obtained by delaying X symbols for the first transmission resource.

It is taken as an example that two repetitive transmissions are performed within a slot, the terminal device takes that the beam switching time as X symbols, computes numbers of symbols occupied by the two repetitive transmissions respectively in the N symbols, determines a number of symbols corresponding to the first repetitive transmission as the first transmission resource, determines X symbols behind the first transmission resource as the beam switching time, and since X is greater than or equal to Y, determines a number of symbols corresponding to the second repetitive transmission behind the beam switching time subtracted with (X−Y) as the second transmission resource.

Figure 33:
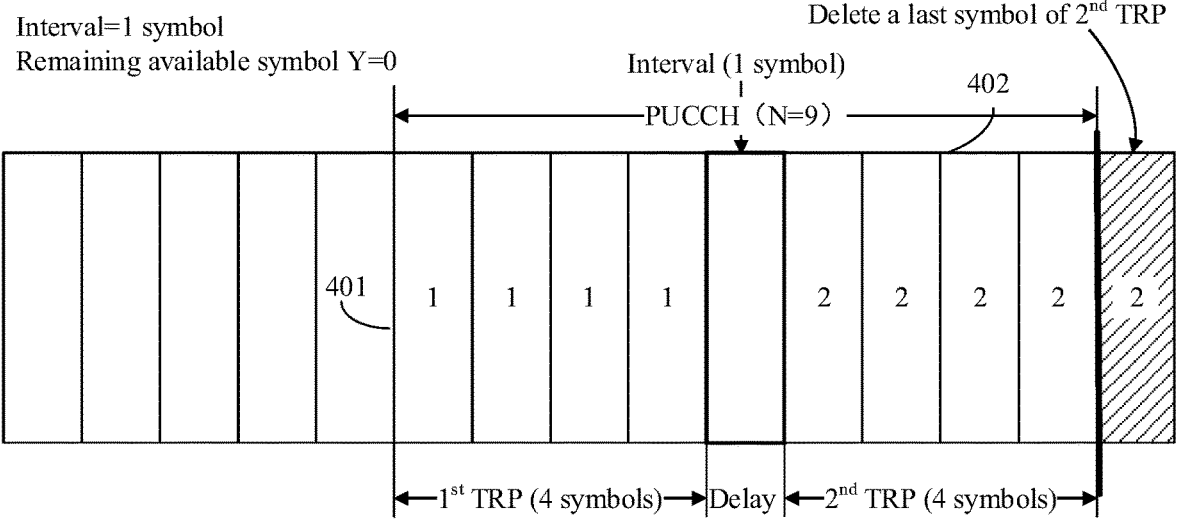
FIG. 33 is a schematic diagram of an uplink channel transmission method provided by an exemplary embodiment of the present application.

For example, as shown in FIG. 33, the beam switching time is 1 symbol, S=6, N=9 and Y=0, then N/2 is rounded down to obtain 4, N/2 is rounded up to obtain 5, and sixth to ninth symbols within the slot are determined as the first transmission resource 401, a tenth symbol is taken as the beam switching time, and eleventh to fourteenth symbols within the slot are determined as the second transmission resource 402.

Step 220, the terminal device performs two adjacent repetitive transmissions of the same data in an uplink channel on the first transmission resource and the second transmission resource, respectively.

Step 240, a network device receives the two adjacent repetitive transmissions of the same data in the uplink channel on the first transmission resource and the second transmission resource, respectively.

As described above, according to the method provided by the present embodiment, by equally distributing the N symbols corresponding to the two repetitive transmission to obtain a number of symbols corresponding to each transmission, determining a number of symbols corresponding to the first repetitive transmission starting from an initial symbol of the two adjacent repetitive transmissions as the first transmission resource, delaying the beam switching time, and determining a number of symbols corresponding to the second repetitive transmission delayed by the beam switching time and subtracted with (X–Y) as the second transmission resource, it is achieved that the terminal device performs repetitive transmissions on the uplink channel facing multiple TRPs of a base station.

(XI) For repetitive transmissions of repetitive type B across a slot for a PUSCH, transmission resources are determined by delaying transmission resources corresponding to the second repetitive transmission.

Figure 34:
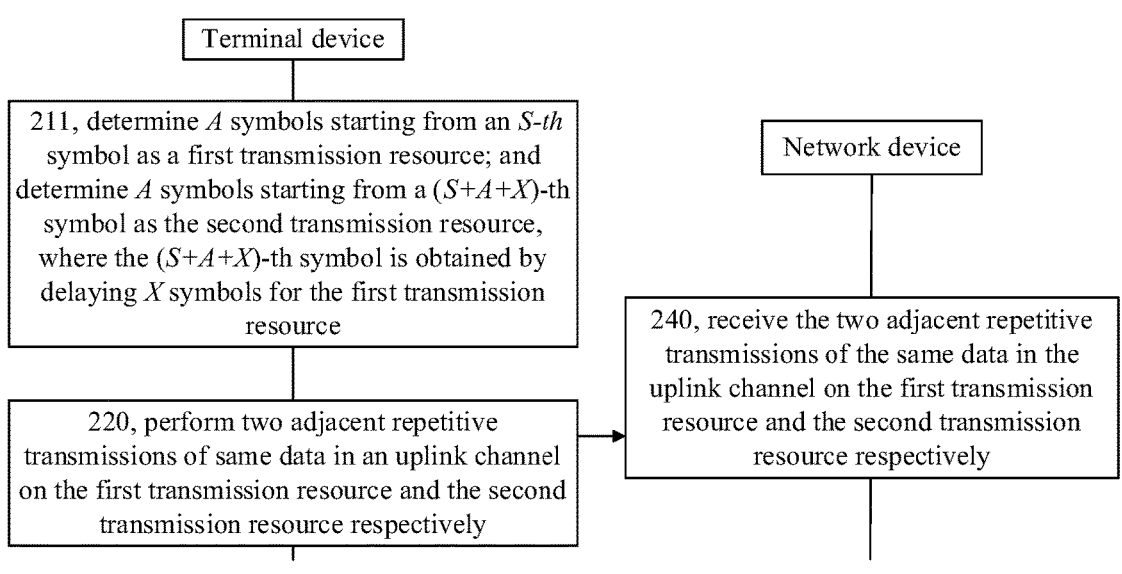
FIG. 34 is a flowchart of an uplink channel transmission method provided by an exemplary embodiment of the present application.

Referring to FIG. 34, FIG. 34 shows a flowchart of an uplink channel transmission method provided by an embodiment of the present application, where the method can be applied to the system architecture shown in FIG. 1.

The method is applied to repetitive transmission of a PUSCH with a cross-slot transmissible capability and configured based on a nominal transmission occasion; the resource configuration of the uplink channel includes: two consecutive nominal transmission occasions configured for the two adjacent repetitive transmissions, each of the nominal transmission occasions occupies time-domain resources of A symbols, the beam switching time includes X symbols, and X and A are positive integers; an initial symbol of the two adjacent repetitive transmissions is an S-th symbol within the slot, and S is a positive integer; The method includes followings steps.

Step 211, a terminal device determines A symbols starting from an S-th symbol as a first transmission resource; and determines A symbols starting from a (S+A+X)-th symbol as the second transmission resource, where the (S+A+X)-th symbol is obtained by delaying X symbols for the first transmission resource.

Illustratively, according to the beam switching time including X symbols and two nominal transmission occasions configured for the two repetitive transmissions, a terminal device determines the first nominal transmission occasion as the first transmission occasion of the first repetitive transmission, and then delays the beam switching time, and determines the second nominal transmission occasion after delaying the beam switching time as the second transmission resource.

Figure 35:
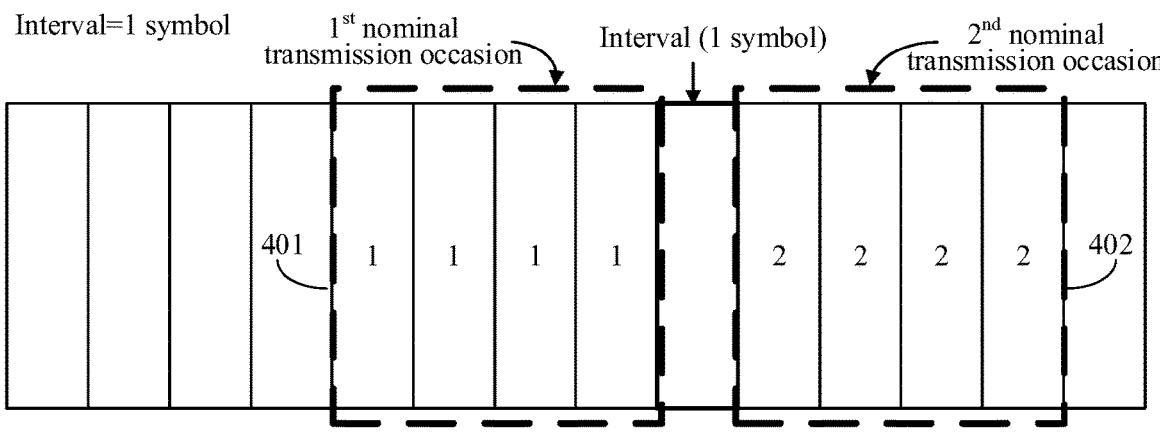
FIG. 35 is a schematic diagram of an uplink channel transmission method provided by an exemplary embodiment of the present application.

For example, as shown in FIG. 35, when each of the nominal transmission occasions occupies 4 symbols, and the beam switching time is 1 symbol, a first nominal transmission occasion and a second nominal transmission occasion are configured to the two adjacent repetitive transmissions. The first nominal transmission occasion is determined as the first transmission resource 401, and a symbol is delayed for the beam switching time, and the second nominal transmission occasion is determined as the second transmission resource 402.

Illustratively, N symbols of the two nominal transmission occasions are configured for the two repetitive transmissions, and when the beam switching time is delayed, N symbols of the transmission resources of the second repetitive transmission will exceed, and at this time, the terminal device can also determine the exceeded symbols as the second transmission resource, the terminal device can also delete the exceeded symbols.

Figure 36:
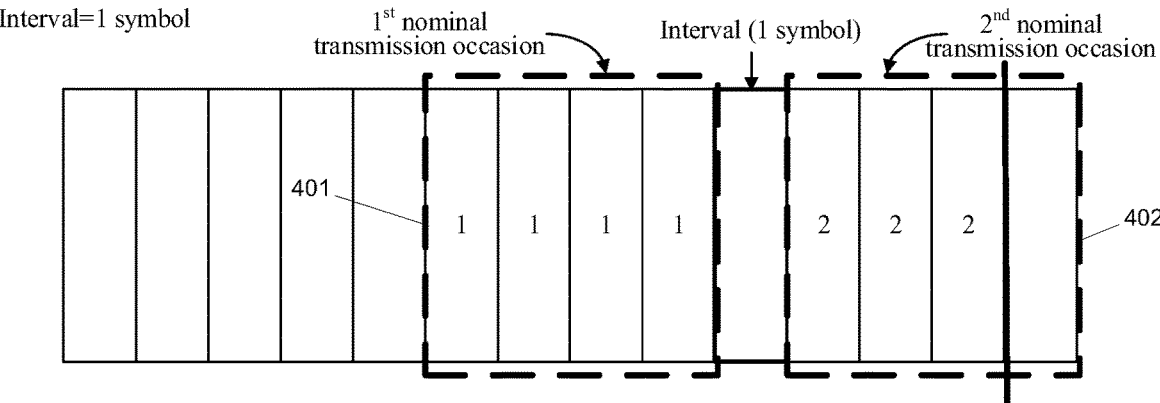
FIG. 36 is a schematic diagram of an uplink channel transmission method provided by an exemplary embodiment of the present application.

For example, as shown in FIG. 36, transmission resources configured for the two repetitive transmissions are two nominal transmission occasions consisted of 8 symbols of fifth to thirteenth symbols within the slot, and after a first nominal transmission occasion is determined as the first transmission resource, a second nominal transmission occasion is delayed by 1 symbol for the beam switching time, and the delayed second nominal transmission occasion will exceed a thirteenth symbol, then a last symbol (a fourteenth symbol) of the second nominal transmission occasion is deleted, and eleventh to thirteenth symbols are determined as the second transmission resource.

Optionally, when the PUSCH is repeated for multiple times, when the beam direction needs to be switched each time, the terminal device delays the beam switching time and then determines the transmission resource for a next time of repetitive transmission. In such way, a length of actual transmission resources will exceed a time-domain resource window configured for the PUSCH repetitive transmissions.

In a case that actual transmission resources exceed the time-domain resource window configured for the multiple times of the repetitive transmissions: the terminal device can delete exceeded transmission resources, and also delete repetitive transmissions exceeding the time-domain resource window; or, the terminal device may not delete the exceeded transmission resources, but to allow to use the exceeded transmission resources for the multiple repetitive transmissions of the PUSCH.

The resource configuration of the uplink channel further includes: K nominal transmission occasions configured for K repetitive transmissions based on PUSCH resources, where the K nominal transmission occasions totally occupy K*A symbols of time-domain resources, and the K repetitive transmissions include B groups of two adjacent repetitive transmissions respectively using different beams to transmit to different TRPs of a base station; where B is a positive integer, and K is a positive integer greater than 1.

In response to that W symbols in transmission resources corresponding to an i-th delayed repetitive transmission are located behind the K*A symbols, the terminal device performs the i-th delayed repetitive transmission of the uplink channel on former (A-W) symbols of transmission resources corresponding to the i-th delayed repetitive transmission, where W is a positive integer smaller than A, and i is a positive integer smaller than or equal to K; and in response to that i is not equal to K, repetitive transmissions behind the i-th repetitive transmission are cancelled.

That is, the terminal device still performs repetitive transmissions of the PUSCH within the time-domain resource window of the K*A symbols.

Figures 37, 38:
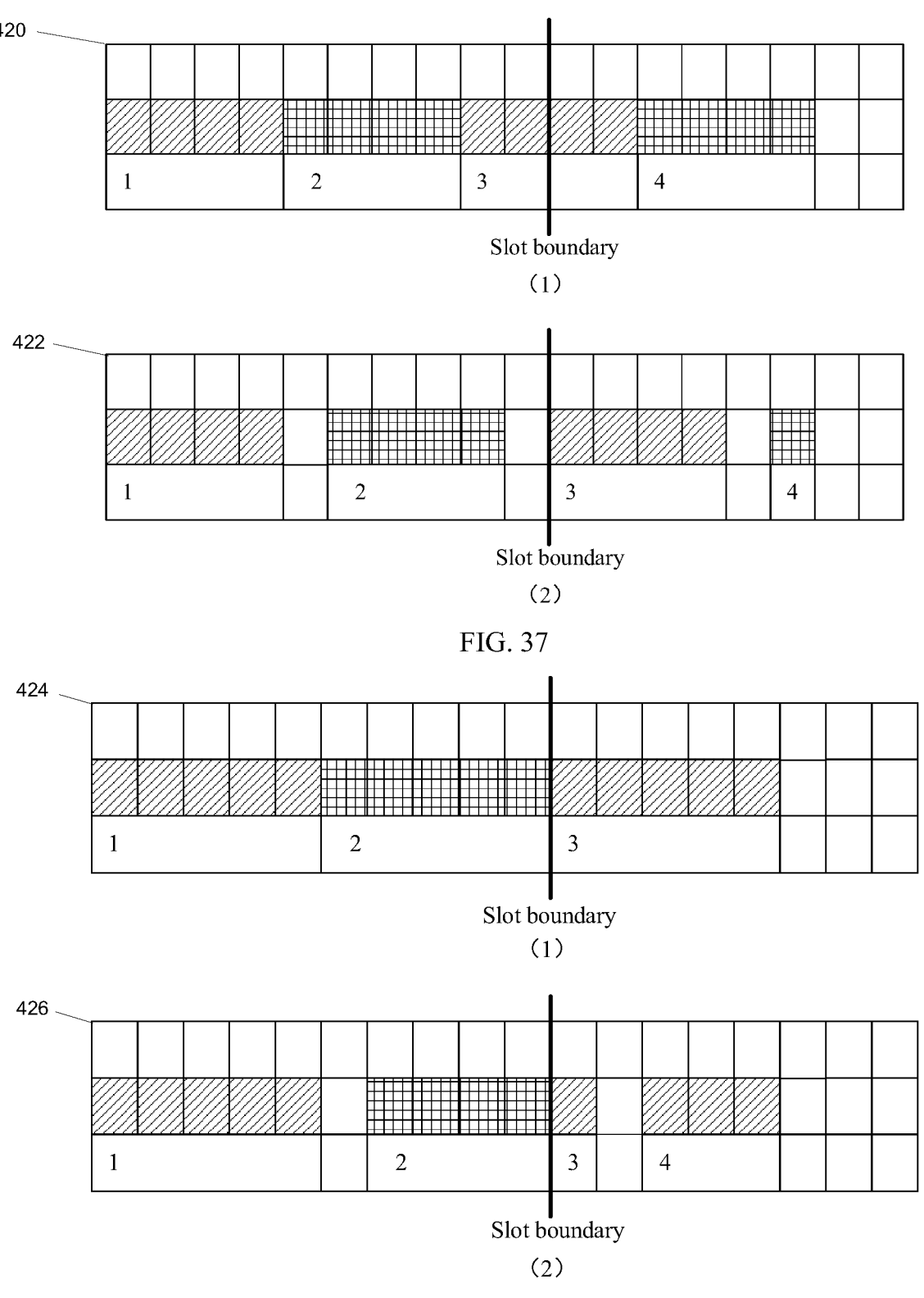
FIG. 37 is a schematic diagram of an uplink channel transmission method provided by an exemplary embodiment of the present application.
FIG. 38 is a schematic diagram of an uplink channel transmission method provided by an exemplary embodiment of the present application.

For example, as shown in (1) of FIG. 37 420, the terminal device is configured to perform 4 times of PUSCH repetitive transmissions, where a first repetitive transmission and a third repetitive transmission are directed to a first TRP of a first beam direction, and a second repetitive transmission and a fourth repetitive transmission are directed to a second TRP of a second beam direction. Each repetitive transmission occupies a nominal transmission occasion, and each nominal transmission occasion includes 4 symbols, thus a length of the time-domain resource window of the repetitive transmissions of the PUSCH includes 4*4=16 symbols. Therefore, actual repetitive transmissions requiring beam direction switching include: the first repetitive transmission and the second repetitive transmission, the second repetitive transmission and the third repetitive transmission, the third repetitive transmission and the fourth repetitive transmission. The terminal device delays the beam switching time between the two adjacent repetitive transmissions and determines the transmission resource of a next transmission. As shown in (2) of FIG. 37 422, when X=1, a first transmission resource used by the first repetitive transmission is first to fourth symbols of a first slot; a fifth symbol of the first slot is the beam switching time, a second transmission resource used by the second repetitive transmission is sixth to ninth symbols of the first slot; a tenth symbol of the first slot is the beam switching time, a third transmission resource used by the third repetitive transmission is first to fourth symbols of a second slot; a fifth symbol of the second slot is the beam switching time, a fourth transmission resource used by the fourth repetitive transmission is a sixth symbol of the second slot, that is, the fourth repetitive transmission, after the transmission occasion is delayed, will exceed a third symbol of the time-domain resource window, and 3 exceeded symbols are deleted, and the fourth repetitive transmission actually uses only one symbol.

For example, as shown in (1) in FIG. 38 424, the terminal device is configured to perform 3 times of PUSCH repetitive transmissions, where a first nominal repetitive transmission and a third nominal repetitive transmission are directed to a first TRP of a first beam direction, and a second nominal repetitive transmission is directed to a second TRP of a second beam direction. Each nominal repetitive transmission occupies a nominal transmission occasion, and each nominal transmission occasion includes 5 symbols, thus a length of the time-domain resource window of the repetitive transmissions of the PUSCH includes 3*5=15 symbols. Therefore, actual repetitive transmissions requiring beam direction switching include: the first nominal repetitive transmission and the second nominal repetitive transmission, the second nominal repetitive transmission and the third nominal repetitive transmission. The terminal device delays the beam switching time between the two adjacent repetitive transmissions and determines the transmission resource of a next transmission. As shown in (2) of FIG. 38 426, when X=1, a first transmission resource used by the first actual repetitive transmission is first to fifth symbols of a first slot; a sixth symbol of the first slot is the beam switching time, and since transmission occasions of the delayed second nominal repetitive transmission exceed a slot boundary of the slot, the second nominal repetitive transmission is divided into a second actual repetitive transmission and a third actual repetitive transmission, where a second transmission resource used by the second actual repetitive transmission is seventh to tenth symbols of the first slot, and a third transmission resource used by the third actual repetitive transmission is a first symbol of a second slot; a second symbol of the second slot is the beam switching time, the third nominal repetitive transmission is the fourth actual repetitive transmission, a fourth transmission resource used by the fourth actual repetitive transmission is third to fifth symbols of the second slot, that is, transmission occasions of the delayed fourth actual repetitive transmission will exceed the time-domain resource window by 2 symbols, and the exceeded 2 symbols are deleted, and the fourth actual repetitive transmission actually uses only 3 symbols.

Alternatively, in response to that at least one symbol in transmission resources corresponding to an i-th delayed repetitive transmission is located behind the K*A symbols, the terminal device continues performing the i-th delayed repetitive transmission on the transmission resources corresponding to the i-th delayed repetitive transmission, where i is a positive integer smaller than or equal to K.

That is, the terminal device performs K transmissions of the PUSCH within the time-domain resource window of the K*A symbols plus B*X symbols.

For example, the terminal device is configured to perform 4 times of PUSCH repetitive transmissions, where a first repetitive transmission and a third repetitive transmission are directed to a first TRP of a first beam direction, and a second repetitive transmission and a fourth repetitive transmission are directed to a second TRP of a second beam direction. Each repetitive transmission occupies a nominal transmission occasion, and each nominal transmission occasion includes 4 symbols, thus a length of the time-domain resource window of the repetitive transmissions of the PUSCH includes 4*4=16 symbols. Therefore, actual repetitive transmissions requiring beam direction switching include: the first repetitive transmission and the second repetitive transmission, the second repetitive transmission and the third repetitive transmission, the third repetitive transmission and the fourth repetitive transmission. The terminal device delays the beam switching time between the two adjacent repetitive transmissions and determines the transmission resource of a next transmission. When the beam switching time is 1 symbol, a first transmission resource used by the first repetitive transmission is first to fourth symbols of a time-domain resource window of a first slot; a fifth symbol of the time-domain resource window is the beam switching time, a second transmission resource used by the second repetitive transmission is sixth to ninth symbols of the time-domain resource window; a tenth symbol of the time-domain resource window is the beam switching time, a third transmission resource used by the third repetitive transmission is eleventh to fourteenth symbols of the time-domain resource window; a fifteenth symbol of the time-domain resource window is the beam switching time, a fourth transmission resource used by the fourth repetitive transmission is a sixteenth symbol of the time-domain resource window and first to third symbols behind the time-domain resource window, that is, after the transmission occasion of the fourth repetitive transmission is delayed, three symbols will exceed the time-domain resource window, and the fourth repetitive transmission actually uses 19 symbols.

Step 220, the terminal device performs two adjacent repetitive transmissions of same data in an uplink channel on the first transmission resource and the second transmission resource respectively.

Step 240, a network device receives the two adjacent repetitive transmissions of the same data in the uplink channel on the first transmission resource and the second transmission resource respectively.

As described above, according to the method provided by the present embodiment, during the multiple repetitive transmissions of the PUSCH, when the beam direction needs to be switched each time, a beam switching time will be delayed, and a transmission resource of a next repetitive transmission is determined according to a length of a nominal transmission occasion, so as to achieve that the terminal device performs repetitive transmissions on the uplink channel facing multiple TRPs of a base station.

(XII) Transmission resources are determined by configuring the beam switching time as an invalid symbol.

Referring to FIG. 39, FIG. 39 shows a flowchart of an uplink channel transmission method provided by an embodiment of the present application, where the method can be applied to the system architecture shown in FIG. 1. The method includes followings steps.

Step 212, a network device sends a resource configuration of an uplink channel to a terminal device, where a first transmission resource and a second transmission resource are determined based on the resource configuration, the resource configuration includes: a beam switching time is configured as an invalid symbol, and the first transmission resource and the second transmission resource are determined from valid symbols indicated by the resource configuration.

Step 213, the terminal device determines a first transmission resource and a second transmission resource based on the resource configuration of the uplink channel, where the resource configuration includes: the beam switching time is configured as an invalid symbol, and the first transmission resource and the second transmission resource are determined from valid symbols indicated by the resource configuration.

Illustratively, the network device can directly configure the beam switching time as an invalid symbol, and the terminal device will not perform repetitive transmissions of the uplink channel on the invalid symbol, thus, the beam switching time is reserved for the terminal device for beam switching.

For example, the beam switching time can be pre-defined, or can be configured as the invalid symbol through RRC (Radio Resource Control), and the terminal deletes the invalid symbol.

Step 220, the terminal device performs two adjacent repetitive transmissions of same data in an uplink channel on the first transmission resource and the second transmission resource respectively.

Step 240, the network device receives the two adjacent repetitive transmissions of the same data in the uplink channel on the first transmission resource and the second transmission resource respectively.

As described above, according to the method provided by the present embodiment, by configuring the beam switching time as the invalid symbol, it is achieved that the terminal device performs repetitive transmissions on the uplink channel facing multiple TRPs of a base station.

FIG. 40 shows a structural block diagram of an uplink channel transmission apparatus provided by an exemplary embodiment of the present application. The apparatus can be implemented as a terminal device, or be implemented as a part of a terminal device, where the apparatus includes: a sending module 501, configured to perform two adjacent repetitive transmissions of the same data in an uplink channel on a first transmission resource and a second transmission resource, respectively; where the two adjacent repetitive transmissions use different transmitting beams to transmit to different Transmit-Receive Points (TRP) of a same base station, a beam switching time for switching a beam direction is presented between time-domain resources of the first transmission resource and the second transmission resource; the first transmission resource corresponds to a former transmission occasion in two adjacent transmission occasions for uplink channel transmitting; the second transmission resource corresponds to a latter transmission occasion in the two adjacent transmission occasions for uplink channel transmitting.

In an optional embodiment, the apparatus further includes: a determining module 502, configured to determine the first transmission resource and the second transmission resource based on a resource configuration of the uplink channel, where at least one of the first transmission resource or the second transmission resource is determined by deleting the beam switching time.

In an optional embodiment, the method is applied to a repetitive transmission of a physical uplink transmission channel (PUCCH) based on sub-slots within a slot; the resource configuration of the uplink channel includes: two consecutive sub-slots configured for the two adjacent repetitive transmissions; the beam switching time includes X symbols, each of the two sub-slots includes M symbols, X and M are positive integers, and X is smaller than or equal to M; the determining module 502 is configured to determine M symbols of a first of the two sub-slots as the first transmission resource; the determining module is configured to determine last (M−X) symbols of a second of the two sub-slots as the second transmission resource.

In an optional embodiment, the method is applied to a repetitive transmission of a PUCCH based on a PUCCH resource within a slot; the resource configuration of the uplink channel includes: N symbols configured for the two adjacent repetitive transmissions on the PUCCH resource, the beam switching time includes X symbols, X is a positive integer, N is an integer greater than 1, and X is smaller than or equal to N; where the apparatus further includes: a computing module 503, configured to compute (N−X)/2 and round down to obtain N1; the computing module 503 is configured to compute (N−X)/2 and round up to obtain N2; the determining module 502 is configured to determine former N1 symbols in the N symbols as the first transmission resource; the determining module 502 is configured to determine last N2 symbols in the N symbols as the second transmission resource.

In an optional embodiment, the method is applied to a repetitive transmission of a PUCCH based on a PUCCH resource within a slot; the resource configuration of the uplink channel includes: N symbols configured for the two adjacent repetitive transmissions on the PUCCH resource, the beam switching time includes X symbols, X is a positive integer, N is an integer greater than 1, and X is smaller than N; where the apparatus further includes: a computing module 503, configured to compute N/2 and round down to obtain N3; the computing module 503 is configured to compute N/2 and round up to obtain N4; the determining module 502 is configured to determine former N3 symbols in the N symbols as the first transmission resource; the determining module 502 is configured to determine last (N4−X) symbols in the N symbols as the second transmission resource.

In an optional embodiment, the method is applied to a repetitive transmission of a PUCCH based on a PUCCH resource within a slot; the resource configuration of the uplink channel includes: N symbols configured for the two adjacent repetitive transmissions on the PUCCH resource, and Y symbols are presented between a last symbol of the N symbols and a first symbol in a next slot; the beam switching time includes X symbols and Y are positive integers, and N is an integer greater than 1; the apparatus further includes: a computing module 503, configured to compute (Y+N−X)/2 and round down to obtain N5; the computing module 503 is configured to compute (Y+N−X)/2 and round up to obtain N6; the determining module 502 is configured to determine former N5 symbols in the (N+Y) symbols as the first transmission resource; the determining module 502 is configured to determine last N6 symbols in the (N+Y) symbols as the second transmission resource.

In an optional embodiment, the method is applied to a repetitive transmission of a PUCCH based on a PUCCH resource within a slot; the resource configuration of the uplink channel includes: N symbols configured for the two adjacent repetitive transmissions on the PUCCH resource, and Y symbols are presented between a last symbol of the N symbols and a first symbol in a next slot; the beam switching time includes X symbols and Y are positive integers, and N is an integer greater than 1; the apparatus further includes: a computing module 503, configured to compute (Y+N)/2 and round down to obtain N7; the computing module 503 is configured to compute (Y+N)/2 and round up to obtain N8; the determining module 502 is configured to determine former N7 symbols in the (N+Y) symbols as the first transmission resource; the determining module 502 is configured to determine last (N8−X) symbols in the (N+Y) symbols as the second transmission resource.

In an optional embodiment, the method is applied to repetitive transmission of a PUSCH with a cross-slot transmissible capability and configured based on a nominal transmission occasion; the resource configuration of the uplink channel includes: two consecutive nominal transmission occasions configured for the two adjacent repetitive transmissions, each of the nominal transmission occasions occupies time-domain resources of A symbols, the beam switching time includes X symbols, and X and A are positive integers;

the determining module 502 is configured to determine A symbols of a former one of the two nominal transmission occasions as the first transmission resource; the determining module 502 is configured to determine last (A−X) symbols of a latter one of the two nominal transmission occasions as the second transmission resource.

In an optional embodiment, the apparatus further includes: a determining module 502, configured to determine the first transmission resource and the second transmission resource based on a resource configuration of the uplink channel, where the second transmission resource is determined by delaying the beam switching time behind the first transmission resource.

In an optional embodiment, the method is applied to a repetitive transmission of a PUCCH based on sub-slots within a slot; the resource configuration of the uplink channel includes: two consecutive sub-slots configured for the two adjacent repetitive transmissions; the beam switching time includes X symbols, each of the two sub-slots includes M symbols, X and M are positive integers, and X is smaller than or equal to M; an initial symbol configured for the two adjacent repetitive transmissions is an S-th symbol within the slot, and S is a positive integer; the determining module 502 is configured to determine a first sub-slot starting from the S-th symbol as the first transmission resource; the determining module 502 is configured to determine a second sub-slot starting from a (S+2M)-th symbol as the second transmission resource, where the (S+2M)-th symbol is obtained by delaying a sub-slot for the first transmission resource.

In an optional embodiment, the determining module 502 is configured to, in response to that last Z symbols in the second sub-slot starting from the (S+2M)-th symbol exceed a slot boundary of the slot, determining former (M−Z) symbols in the second sub-slot as the second transmission resource, where Z is a positive integer smaller than M.

In an optional embodiment, the method is applied to a repetitive transmission of a PUCCH based on sub-slots within a slot; the resource configuration of the uplink channel includes: two consecutive sub-slots configured for the two adjacent repetitive transmissions; the beam switching time includes X symbols, each of the two sub-slots includes M symbols, X and M are positive integers, and X is smaller than or equal to M; an initial symbol configured for the two adjacent repetitive transmissions is an S-th symbol within the slot, and S is a positive integer; the determining module 502 is configured to determine a first sub-slot starting from the S-th symbol as the first transmission resource; The determining module 502 is configured to determine a second sub-slot starting from a (S+M+X)-th symbol as the second transmission resource, where the (S+M+X)-th symbol is obtained by delaying X symbols for the first transmission resource.

In an optional embodiment, the determining module 502 is configured to, in response to that last Z symbols in the second sub-slot starting from the (S+M+X)-th symbol exceed a slot boundary of the slot, determining former (M−Z) symbols in the second sub-slot as the second transmission resource, where Z is a positive integer smaller than M.

In an optional embodiment, the method is applied to a repetitive transmission of a PUCCH based on a PUCCH resource within a slot; the resource configuration of the uplink channel includes: N symbols configured for the two adjacent repetitive transmissions on the PUCCH resource, and Y symbols are presented between a last symbol of the N symbols and a first symbol in a next slot; the beam switching time includes X symbols, X, Y and N are positive integers, and X is smaller than or equal to Y; an initial symbol configured for the two adjacent repetitive transmissions is an S-th symbol within the slot, and S is a positive integer; the apparatus further includes: a computing module 503, configured to compute N/2 and round down to obtain N3; the computing module 503 is configured to compute N/2 and round up to obtain N4; the determining module 502 is configured to determine N3 symbols starting from the S-th symbol as the first transmission resource; the determining module 502 is configured to determine N4 symbols starting from a (S+N3+X)-th symbol as the second transmission resource, where the (S+N3+X)-th symbol is obtained by delaying X symbols for the first transmission resource.

In an optional embodiment, the method is applied to a repetitive transmission of a PUCCH based on a PUCCH resource within a slot; the resource configuration of the uplink channel includes: N symbols configured for the two adjacent repetitive transmissions on the PUCCH resource, and Y symbols are presented between a last symbol of the N symbols and a first symbol in a next slot; the beam switching time includes X symbols, X, Y and N are positive integers, and X is greater than or equal to Y; an initial symbol configured for the two adjacent repetitive transmissions is an S-th symbol within the slot, and S is a positive integer; the apparatus further includes: a computing module 503, configured to compute N/2 and round down to obtain N3; the computing module 503 is configured to compute N/2 and round up to obtain N4; the determining module 502 is configured to determine N3 symbols starting from the S-th symbol as the first transmission resource; the determining module 502 is configured to determine (N4−(X−Y)) symbols starting from a (S+N3+X)-th symbol as the second transmission resource, where the (S+N3+X)-th symbol is obtained by delaying X symbols for the first transmission resource.

In an optional embodiment, the method is applied to repetitive transmission of a PUSCH with a cross-slot transmissible capability and configured based on a nominal transmission occasion; the resource configuration of the uplink channel includes: two consecutive nominal transmission occasions configured for the two adjacent repetitive transmissions, each of the nominal transmission occasions occupies time-domain resources of A symbols, the beam switching time includes X symbols, and X and A are positive integers; an initial symbol of the two adjacent repetitive transmissions is an S-th symbol within the slot, and S is a positive integer; the determining module 502 is configured to determine A symbols starting from the S-th symbol as the first transmission resource; the determining module 502 is configured to determine A symbols starting from a (S+A+X)-th symbol as the second transmission resource, where the (S+A+X)-th symbol is obtained by delaying X symbols for the first transmission resource.

In an optional embodiment, the resource configuration of the uplink channel further includes: K nominal transmission occasions configured for K times of repetitive transmissions based on the PUSCH resource, where the K nominal transmission occasions totally occupy time resources of K*A symbols, and K is an integer greater than 1; the sending module 501 is configured to, in response to that at least one symbol in transmission resources corresponding to an i-th delayed repetitive transmission is located behind the K*A symbols, continue performing the i-th delayed repetitive transmission on the transmission resources corresponding to the i-th delayed repetitive transmission, where i is a positive integer smaller than or equal to K.

In an optional embodiment, the resource configuration of the uplink channel further includes: K nominal transmission occasions configured for K times of repetitive transmissions based on the PUSCH resource, where the K nominal transmission occasions totally occupy time resources of K*A symbols, and K is an integer greater than 1; the sending module 501 is configured to, in response to that W symbols in transmission resources corresponding to an i-th delayed repetitive transmission is located behind the K*A symbols, perform the i-th delayed repetitive transmission of the uplink channel on former (A-W) symbols of transmission resources corresponding to the i-th delayed repetitive transmission, where W is a positive integer smaller than A, and i is a positive integer smaller than or equal to K; and the sending module 501 is configured to, in response to that i is not equal to K, cancel repetitive transmissions after the i-th delayed repetitive transmission.

In an optional embodiment, the apparatus further includes: a determining module 502, configured to determine the first transmission resource and the second transmission resource based on a resource configuration of the uplink channel, where the resource configuration includes: the beam switching time is configured as an invalid symbol, and the first transmission resource and the second transmission resource are determined from valid symbols indicated by the resource configuration.

In an optional embodiment, the beam switching time is configured or pre-defined by a network device.

FIG. 41 shows a structural block diagram of an uplink channel transmission apparatus provided by an exemplary embodiment of the present application. The apparatus can be implemented as a network device, or be implemented as a part of a network device, where the apparatus includes: a receiving module 504, configured to receive two adjacent repetitive transmissions of the same data in an uplink channel on a first transmission resource and a second transmission resource, respectively; where the two adjacent repetitive transmissions use different transmitting beams to transmit to different Transmit-Receive Points (TRP) of the network device, a beam switching time for switching a beam direction is presented between time-domain resources of the first transmission resource and the second transmission resource; the first transmission resource corresponds to a former transmission occasion in two adjacent transmission occasions for uplink channel transmitting; the second transmission resource corresponds to a latter transmission occasion in the two adjacent transmission occasions for uplink channel transmitting.

In an optional embodiment, the first transmission resource and the second transmission resource are determined based on a resource configuration of the uplink channel, and at least one of the first transmission resource or the second transmission resource is determined by deleting the beam switching time.

In an optional embodiment, the method is applied to a repetitive transmission of a physical uplink transmission channel (PUCCH) based on sub-slots within a slot; the resource configuration of the uplink channel includes: two consecutive sub-slots configured for the two adjacent repetitive transmissions; the beam switching time includes X symbols, each of the two sub-slots includes M symbols, X and M are positive integers, and X is smaller than or equal to M; the first transmission resource includes M symbols of a first of the two sub-slots; the second transmission resource includes last (M−X) symbols of a second of the two sub-slots.

In an optional embodiment, the method is applied to a repetitive transmission of a PUCCH based on a PUCCH resource within a slot; the resource configuration of the uplink channel includes: N symbols configured for the two adjacent repetitive transmissions on the PUCCH resource, the beam switching time includes X symbols, X is a positive integer, N is an integer greater than 1, and X is smaller than or equal to N; the first transmission resource includes former N1 symbols of the N symbols, and N1 is (N−X)/2 rounded down; the second transmission resource includes last N2 symbols of the N symbols, and N2 is (N−X)/2 rounded up.

In an optional embodiment, the method is applied to a repetitive transmission of a PUCCH based on a PUCCH resource within a slot; the resource configuration of the uplink channel includes: N symbols configured for the two adjacent repetitive transmissions on the PUCCH resource, the beam switching time includes X symbols, X is a positive integer, N is an integer greater than 1, and X is smaller than N; the first transmission resource includes former N3 symbols of the N symbols, and N3 is N/2 rounded down; the second transmission resource includes last (N4−X) symbols of the N symbols, and N4 is N/2 rounded up.

In an optional embodiment, the method is applied to a repetitive transmission of a PUCCH based on a PUCCH resource within a slot; the resource configuration of the uplink channel includes: N symbols configured for the two adjacent repetitive transmissions on the PUCCH resource, and Y symbols are presented between a last symbol of the N symbols and a first symbol in a next slot; the beam switching time includes X symbols and Y are positive integers, and N is an integer greater than 1; the first transmission resource includes former N5 symbols of the (N+Y) symbols, and N5 is (Y+N−X)/2 rounded down; the second transmission resource includes last N6 symbols of the (N+Y) symbols, and N6 is (Y+N−X)/2 rounded up.

In an optional embodiment, the method is applied to a repetitive transmission of a PUCCH based on a PUCCH resource within a slot; the resource configuration of the uplink channel includes: N symbols configured for the two adjacent repetitive transmissions on the PUCCH resource, and Y symbols are presented between a last symbol of the N symbols and a first symbol in a next slot; the beam switching time includes X symbols and Y are positive integers, and N is an integer greater than 1; the first transmission resource includes former N7 symbols of the (N+Y) symbols, and N7 is (Y+N)/2 rounded down; the second transmission resource includes last (N8−X) symbols of the (N+Y) symbols, and N8 is (Y+N)/2 rounded up.

In an optional embodiment, the method is applied to repetitive transmission of a PUSCH with a cross-slot transmissible capability and configured based on a nominal transmission occasion; the resource configuration of the uplink channel includes: two consecutive nominal transmission occasions configured for the two adjacent repetitive transmissions, each of the nominal transmission occasions occupies time-domain resources of A symbols, the beam switching time includes X symbols, and X and A are positive integers;

the first transmission resource includes A symbols in a former one of the two nominal transmission occasions; the second transmission resource includes last (A−X) symbols of a latter one of the two nominal transmission occasions.

In an optional embodiment, the first transmission resource and the second transmission resource are determined based on a resource configuration of the uplink channel, and the second transmission resource is determined by delaying the beam switching time behind the first transmission resource.

In an optional embodiment, the method is applied to a repetitive transmission of a PUCCH based on sub-slots within a slot; the resource configuration of the uplink channel includes: two consecutive sub-slots configured for the two adjacent repetitive transmissions; the beam switching time includes X symbols, each of the two sub-slots includes M symbols, X and M are positive integers, and X is smaller than or equal to M; an initial symbol configured for the two adjacent repetitive transmissions is an S-th symbol within the slot, and S is a positive integer; the first transmission resource includes a first sub-slot starting from the S-th symbol; the second transmission resource includes a second sub-slot starting from a (S+2M)-th symbol, where the (S+2M)-th symbol is obtained by delaying a sub-slot for the first transmission resource.

In an optional embodiment, when last Z symbols in the second sub-slot starting from the (S+2M)-th symbol exceed a slot boundary of the slot, the second transmission resource includes former (M−Z) symbols in the second sub-slot, where Z is a positive integer smaller than M.

In an optional embodiment, the method is applied to a repetitive transmission of a PUCCH based on sub-slots within a slot; the resource configuration of the uplink channel includes: two consecutive sub-slots configured for the two adjacent repetitive transmissions; the beam switching time includes X symbols, each of the two sub-slots includes M symbols, X and M are positive integers, and X is smaller than or equal to M; an initial symbol configured for the two adjacent repetitive transmissions is an S-th symbol within the slot, and S is a positive integer; the first transmission resource includes a first sub-slot starting from the S-th symbol; the second transmission resource includes a second sub-slot starting from a (S+M+X)-th symbol, where the (S+M+X)-th symbol is obtained by delaying X symbols for the first transmission resource.

In an optional embodiment, when last Z symbols in the second sub-slot starting from the (S+M+X)-th symbol exceed a slot boundary of the slot, the second transmission resource includes former (M−Z) symbols in the second sub-slot, where Z is a positive integer smaller than M.

In an optional embodiment, the method is applied to a repetitive transmission of a PUCCH based on a PUCCH resource within a slot; the resource configuration of the uplink channel includes: N symbols configured for the two adjacent repetitive transmissions on the PUCCH resource, and Y symbols are presented between a last symbol of the N symbols and a first symbol in a next slot; the beam switching time includes X symbols, X, Y and N are positive integers, and X is smaller than or equal to Y; an initial symbol configured for the two adjacent repetitive transmissions is an S-th symbol within the slot, and S is a positive integer; the apparatus further includes: the first transmission resource includes N3 symbols starting from the S-th symbol; the second transmission resource includes N4 symbols starting from a (S+N3+X)-th symbol, where the (S+N3+X)-th symbol is obtained by delaying X symbols for the first transmission resource.

In an optional embodiment, the method is applied to a repetitive transmission of a PUCCH based on a PUCCH resource within a slot; the resource configuration of the uplink channel includes: N symbols configured for the two adjacent repetitive transmissions on the PUCCH resource, and Y symbols are presented between a last symbol of the N symbols and a first symbol in a next slot; the beam switching time includes X symbols, X, Y and N are positive integers, and X is greater than or equal to Y; an initial symbol configured for the two adjacent repetitive transmissions is an S-th symbol within the slot, and S is a positive integer; the apparatus further includes: the first transmission resource includes N3 symbols starting from the S-th symbol; the second transmission resource includes (N4−(X−Y)) symbols starting from a (S+N3+X)-th symbol, where the (S+N3+X)-th symbol is obtained by delaying X symbols for the first transmission resource.

In an optional embodiment, the method is applied to repetitive transmission of a PUSCH with a cross-slot transmissible capability and configured based on a nominal transmission occasion; the resource configuration of the uplink channel includes: two consecutive nominal transmission occasions configured for the two adjacent repetitive transmissions, each of the nominal transmission occasions occupies time-domain resources of A symbols, the beam switching time includes X symbols, and X and A are positive integers; an initial symbol of the two adjacent repetitive transmissions is an S-th symbol within the slot, and S is a positive integer; the first transmission resource includes A symbols starting from the S-th symbol; the second transmission resource includes A symbols starting from a (S+A+X)-th symbol, where the (S+A+X)-th symbol is obtained by delaying X symbols for the first transmission resource.

In an optional embodiment, the resource configuration of the uplink channel further includes: K nominal transmission occasions configured for K times of repetitive transmissions based on the PUSCH resource, where the K nominal transmission occasions totally occupy time resources of K*A symbols, and K is an integer greater than 1; the receiving module 504 is configured to, when at least one symbol in transmission resources corresponding to an i-th delayed repetitive transmission is located behind the K*A symbols, continue receiving the i-th delayed repetitive transmission on the transmission resources corresponding to the i-th delayed repetitive transmission, where i is a positive integer smaller than or equal to K.

In an optional embodiment, the resource configuration of the uplink channel further includes: K nominal transmission occasions configured for K times of repetitive transmissions based on the PUSCH resource, where the K nominal transmission occasions totally occupy time resources of K*A symbols, and K is an integer greater than 1; the receiving module 504 is configured to, when W symbols in transmission resources corresponding to an i-th delayed repetitive transmission is located behind the K*A symbols, perform the i-th delayed repetitive transmission of the uplink channel on former (A-W) symbols of transmission resources corresponding to the i-th delayed repetitive transmission, where W is a positive integer smaller than A, and i is a positive integer smaller than or equal to K; and the receiving module 504 is configured to, when i is not equal to K, cancel repetitive transmissions after the i-th delayed repetitive transmission.

In an optional embodiment, the apparatus further includes: a configuring module 505, configured to send a resource configuration of the uplink channel to the terminal device, where the first transmission resource and the second transmission resource are determined based on the resource configuration, the resource configuration includes: the beam switching time is configured as an invalid symbol, and the first transmission resource and the second transmission resource are determined from valid symbols indicated by the resource configuration.

In an optional embodiment, the apparatus further includes: a configuring module 505, configured to configure or pre-define the beam switching time.

Figure 42:
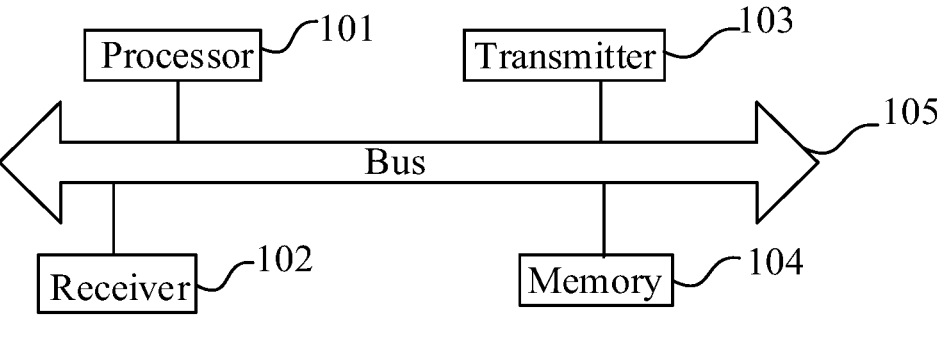
FIG. 42 is a schematic structural diagram of a communication device provided by an exemplary embodiment of the present application.

FIG. 42 shows a schematic structural diagram of a communication device (terminal device or network device) provided by an exemplary embodiment of the present application. The communication device includes a processor 101, a receiver 102, a transmitter 103, a memory 104, and a bus 105.

The processor 101 includes one or more processing cores, and the processor 101 executes various functional applications and information processing by running software programs and modules.

The receiver 102 and the transmitter 103 can be realized as a communication component, which may be a communication chip.

The memory 104 is connected to the processor 101 through the bus 105.

The memory 104 can be used to store at least one instruction, and the processor 101 is used to execute the at least one instruction, so as to realize the steps in the above method embodiments.

In addition, the memory 104 can be realized by any type of volatile or non-volatile memory devices or their combinations, including but not limited to magnetic disks or optical disks, electrically-erasable programmable read only memory (EEPROM), Erasable programmable read only memory (EPROM), Static Random Access Memory (SRAM), read only memory (ROM), magnetic memory, flash memory, programmable read only memory (PROM).

When the communication device is implemented as a terminal device, the processor and transceiver in the communication device, according to the embodiment of the present application, can perform the steps performed by the terminal device in any of the above-mentioned methods, which are not repeated here.

In another possible implementation, when the communication device is implemented as a terminal device, the transceiver is configured to perform two adjacent repetitive transmissions of the same data in an uplink channel on a first transmission resource and a second transmission resource, respectively; where the two adjacent repetitive transmissions use different transmitting beams to transmit to different Transmit-Receive Points (TRP) of a same base station, a beam switching time for switching a beam direction is presented between time-domain resources of the first transmission resource and the second transmission resource; the first transmission resource corresponds to a former transmission occasion in two adjacent transmission occasions for uplink channel transmitting; the second transmission resource corresponds to a latter transmission occasion in the two adjacent transmission occasions for uplink channel transmitting.

When the communication device is implemented as a network device, the processor and transceiver in the communication device according to the embodiment of the present application can perform the steps performed by the network device in any of the above-mentioned methods, which are not repeated here.

In another possible implementation, when the communication device is implemented as a network device, the transceiver is configured to receive two adjacent repetitive transmissions of same data in an uplink channel on a first transmission resource and a second transmission resource respectively; where the two adjacent repetitive transmissions use different transmitting beams to transmit to different Transmit-Receive Points (TRP) of the network device, a beam switching time for switching a beam direction is presented between time-domain resources of the first transmission resource and the second transmission resource; the first transmission resource corresponds to a former transmission occasion in two adjacent transmission occasions for uplink channel transmitting; the second transmission resource corresponds to a latter transmission occasion in the two adjacent transmission occasions for uplink channel transmitting.

In an exemplary embodiment, a computer-readable storage medium is also provided, in which at least one instruction, at least one program, a code set or an instruction set is stored, and the at least one instruction, the at least one program, the code set or the instruction set are loaded and executed by a processor to realize the uplink channel transmission method executed by a communication device provided by the above method embodiments.

In an exemplary embodiment, a chip is further provided, where the chip includes a programmable logic circuit and/or a program instruction, and when running on a computer device, the chip is configured to perform the uplink channel transmission method according to above aspects.

In an exemplary embodiment, a computer program product is provided, where when running on a processor of a computer device, the computer program product causes the computer device to perform the uplink channel transmission method according to above aspects.

Those of ordinary skills in the art can understand that all or part of the steps to realize the above-mentioned embodiment can be completed by hardware, or related hardware can be instructed to complete by a program, which can be stored in a computer-readable storage medium, and the above-mentioned storage medium can be read-only memory, magnetic disk or optical disk, etc.

The above is only optional embodiments of the present application, and they are not used to limit the present application. Any modification, equivalent substitution, improvement, etc., made within the spirit and principle of the present application should be included in the protection scope of the present application.

The invention claimed is:

1. An uplink channel transmission method, performed by a terminal device, comprising:
  performing two adjacent repetitive transmissions of same data in an uplink channel on a first transmission resource and a second transmission resource respectively;

wherein the two adjacent repetitive transmissions use different transmitting beams to transmit to different Transmit-Receive Points (TRP) of a same base station, a beam switching time for switching a beam direction is presented between time-domain resources of the first transmission resource and the second transmission resource; the first transmission resource corresponds to a former transmission occasion in two adjacent transmission occasions for uplink channel transmitting; the second transmission resource corresponds to a latter transmission occasion in the two adjacent transmission occasions for uplink channel transmitting;

wherein the method further comprises:

determining the first transmission resource and the second transmission resource based on a resource configuration of the uplink channel, wherein the second transmission resource is determined by delaying a beam switching time behind the first transmission resource;

wherein the method is applied to a repetitive transmission of a physical uplink control channel (PUCCH) based on sub-slots within a slot; the resource configuration of the uplink channel comprises:

two consecutive sub-slots configured for the two adjacent repetitive transmissions; the beam switching time comprises X symbols, each of the two sub-slots comprises M symbols, X and M are positive integers, and X is smaller than or equal to M; an initial symbol configured for the two adjacent repetitive transmissions is an S-th symbol within the slot, and S is a positive integer;

determining the first transmission resource and the second transmission resource based on the resource configuration of the uplink channel comprises:

determining a first sub-slot starting from the S-th symbol as the first transmission resource; and performing at least one of:

determining a second sub-slot starting from a (S+2M)-th symbol as the second transmission resource, wherein the (S+2M)-th symbol is obtained by delaying a sub-slot for the first transmission resource; or determining the second sub-slot starting from a (S+M+X)-th symbol as the second transmission resource, wherein the (S+M+X)-th symbol is obtained by delaying X symbols for the first transmission resource;

wherein determining the second sub-slot starting from the (S+2M)-th symbol as the second transmission resource comprises:

in response to that last Z symbols in the second sub-slot starting from the (S+2M)-th symbol exceed a slot boundary of the slot, determining former (M−Z) symbols in the second sub-slot as the second transmission resource, wherein Z is a positive integer smaller than M;

or, determining the second sub-slot starting from the (S+M+X)-th symbol as the second transmission resource comprises:

in response to that last Z symbols in the second sub-slot starting from the (S+M+Z)-th symbol exceed a slot boundary of the slot, determining former (M−Z) symbols in the second sub-slot as the second transmission resource, wherein Z is a positive integer smaller than M.

2. The method according to claim 1, wherein the method further comprises:

determining the first transmission resource and the second transmission resource based on the resource configuration of the uplink channel, wherein the resource configuration comprises: the beam switching time is configured as an invalid symbol, and the first transmission resource and the second transmission resource are determined from valid symbols indicated by the resource configuration.

3. The method according to claim 1, wherein the beam switching time is configured or pre-defined by a network device.

4. The uplink channel transmission method according to claim 1, wherein a network device receives the two adjacent repetitive transmissions of same data in the uplink channel on the first transmission resource and the second transmission resource respectively.

5. The method according to claim 4, wherein the network device sends the resource configuration of the uplink channel to the terminal device, wherein the first transmission resource and the second transmission resource are determined based on the resource configuration, the resource configuration comprises:

the beam switching time is configured as an invalid symbol, and the first transmission resource and the second transmission resource are determined from valid symbols indicated by the resource configuration.

6. A terminal device, comprising: a processor; and a transceiver connected with the processor; wherein the transceiver is configured to perform the uplink channel transmission method according to claim 1.

7. A non-transitory computer-readable storage medium, storing an executable instruction, wherein the executable instruction is loaded and executed by a processor to perform the uplink channel transmission method according to claim 1.

8. An uplink channel transmission method, performed by a terminal device, comprising:

performing two adjacent repetitive transmissions of same data in an uplink channel on a first transmission resource and a second transmission resource respectively;

wherein the two adjacent repetitive transmissions use different transmitting beams to transmit to different Transmit-Receive Points (TRP) of a same base station, a beam switching time for switching a beam direction is presented between time-domain resources of the first transmission resource and the second transmission resource; the first transmission resource corresponds to a former transmission occasion in two adjacent transmission occasions for uplink channel transmitting; the second transmission resource corresponds to a latter transmission occasion in the two adjacent transmission occasions for uplink channel transmitting;

wherein the method further comprises:

determining the first transmission resource and the second transmission resource based on a resource configuration of the uplink channel, wherein the second transmission resource is determined by delaying the beam switching time behind the first transmission resource;

wherein the method is applied to a repetitive transmission of a physical uplink control channel (PUCCH) based on a PUCCH resource within a slot;

the resource configuration of the uplink channel comprises: N symbols configured for the two adjacent repetitive transmissions on the PUCCH resource, and Y symbols are presented between a last symbol of the N symbols and a first symbol in a next slot; the beam switching time comprises X symbols, X, Y and N are positive integers; an initial symbol configured for the two adjacent repetitive transmissions is a S-th symbol within the slot, and S is a positive integer;

wherein X is smaller than or equal to Y, and determining the first transmission resource and the second transmission resource based on the resource configuration of the uplink channel comprises:

computing N/2 and rounding down to obtain N3;

computing N/2 and rounding up to obtain N4;

determining N3 symbols starting from the S-th symbol as the first transmission resource; and determining N4 symbols starting from a (S+N3+X)-th symbol as the second transmission resource, wherein the (S+N3+X)-th symbol is obtained by delaying X symbols for the first transmission resource;

or, wherein X is greater than or equal to Y, and determining the first transmission resource and the second transmission resource based on the resource configuration of the uplink channel comprises:

computing N/2 and rounding down to obtain N3;

computing N/2 and rounding up to obtain N4;

determining N3 symbols starting from the S-th symbol as the first transmission resource; and determining (N4−(X−Y)) symbols starting from a (S+N3+X)-th symbol as the second transmission resource, wherein the (S+N3+X)-th symbol is obtained by delaying X symbols for the first transmission resource.

9. An uplink channel transmission method, performed by a terminal device, comprising:

performing two adjacent repetitive transmissions of same data in an uplink channel on a first transmission resource and a second transmission resource respectively;

wherein the two adjacent repetitive transmissions use different transmitting beams to transmit to different Transmit-Receive Points (TRP) of a same base station, a beam switching time for switching a beam direction is presented between time-domain resources of the first transmission resource and the second transmission resource; the first transmission resource corresponds to a former transmission occasion in two adjacent transmission occasions for uplink channel transmitting; the second transmission resource corresponds to a latter transmission occasion in the two adjacent transmission occasions for uplink channel transmitting;

wherein the method further comprises:

determining the first transmission resource and the second transmission resource based on a resource configuration of the uplink channel, wherein the second transmission resource is determined by delaying the beam switching time behind the first transmission resource;

wherein the method is applied to repetitive transmission of a physical uplink shared channel (PUSCH) within a slot with a cross-slot transmissible capability and configured based on a nominal transmission occasion; the resource configuration of the uplink channel comprises:

two consecutive nominal transmission occasions configured for the two adjacent repetitive transmissions, each of the nominal transmission occasions occupies time-domain resources of A symbols, the beam switching time comprises X symbols, and X and A are positive integers; an initial symbol of the two adjacent repetitive transmissions is an S-th symbol within a slot, and S is a positive integer;

determining the first transmission resource and the second transmission resource based on the resource configuration of the uplink channel comprises:

determining A symbols starting from the S-th symbol as the first transmission resource; and determining A symbols starting from a (S+A+X)-th symbol as the second transmission resource, wherein the (S+A+X)-th symbol is obtained by delaying X symbols for the first transmission resource.

10. The method according to claim 9, wherein the resource configuration of the uplink channel further comprises:

K nominal transmission occasions configured for K times of repetitive transmissions based on the PUSCH resource, wherein the K nominal transmission occasions totally occupy time resources of K*A symbols, wherein the operation "*" represents a multiplication, and K is an integer greater than 1; the method further comprises:

in response to that at least one symbol in transmission resources corresponding to an i-th delayed repetitive transmission is located behind the K*A symbols, continuing performing the i-th delayed repetitive transmission on the transmission resources corresponding to the i-th delayed repetitive transmission, wherein i is a positive integer smaller than or equal to K; or, in response to that W symbols in transmission resources corresponding to an i-th delayed repetitive transmission is located behind the K*A symbols, performing the i-th delayed repetitive transmission of the uplink channel on former (A-W) symbols of transmission resources corresponding to the i-th delayed repetitive transmission, wherein W is a positive integer smaller than A, and i is a positive integer smaller than or equal to K; and in response to that i is not equal to K, canceling repetitive transmissions after the i-th delayed repetitive transmission.

* * * * *